United States Patent
Cho et al.

(10) Patent No.: US 10,845,880 B2
(45) Date of Patent: Nov. 24, 2020

(54) METHOD, DEVICE, AND COMPUTER-READABLE MEDIUM FOR CONTROLLING TACTILE INTERFACE DEVICE INTERACTING WITH USER

(71) Applicant: GACHON UNIVERSITY-INDUSTRY FOUNDATION, Seongnam-si (KR)

(72) Inventors: Jin Soo Cho, Seongnam-si (KR); Hey Lim Lee, Seongnam-si (KR)

(73) Assignee: GACHON UNIVERSITY-INDUSTRY FOUNDATION, Seongnam-si (KR)

( * ) Notice: Subject to any disclaimer, the term of this patent is extended or adjusted under 35 U.S.C. 154(b) by 133 days.

(21) Appl. No.: 16/163,973

(22) Filed: Oct. 18, 2018

(65) Prior Publication Data
US 2019/0050057 A1 Feb. 14, 2019

Related U.S. Application Data

(63) Continuation of application No. PCT/KR2017/001189, filed on Feb. 3, 2017.

(30) Foreign Application Priority Data

Apr. 20, 2016 (KR) ........................ 10-2016-0048345

(51) Int. Cl.
*G06F 3/01* (2006.01)
*G09B 21/00* (2006.01)
(Continued)

(52) U.S. Cl.
CPC .............. *G06F 3/016* (2013.01); *G06F 3/017* (2013.01); *G06F 3/0482* (2013.01);
(Continued)

(58) Field of Classification Search
CPC .... G06F 3/016; G06F 3/0482; G06F 3/04886; G06F 3/04883; G06F 3/04812;
(Continued)

(56) References Cited

U.S. PATENT DOCUMENTS 9,812,033 B2    11/2017  Chari et al.
2012/0151349 A1  6/2012  Hahm et al.
(Continued)

FOREIGN PATENT DOCUMENTS

JP    H09-325688 A   12/1997
JP    H10-069218 A    3/1998
(Continued)

OTHER PUBLICATIONS

International Search Report issued in PCT/KR2017/001189; dated May 15, 2017.

*Primary Examiner* — Abhishek Sarma
(74) *Attorney, Agent, or Firm* — Studebaker & Brackett PC

(57) ABSTRACT

The present invention relates to a method, a device, and a non-transitory computer-readable medium for controlling a tactile interface device interacting with a user. The method of controlling the tactile interface device according to an embodiment of the present invention includes an input information generating step of generating input information into an application being executed in the computing device based on an input from the tactile interface device; and an output information generating step of generating output information to the tactile interface device based on an output of a focus area among outputs from the application being executed in the computing device.

17 Claims, 18 Drawing Sheets

(51) Int. Cl.
*G06F 3/0482* (2013.01)
*G06F 3/0481* (2013.01)
*G06F 3/0488* (2013.01)
*G10L 13/02* (2013.01)

(52) U.S. Cl.
CPC ...... *G06F 3/04812* (2013.01); *G06F 3/04883* (2013.01); *G06F 3/04886* (2013.01); *G09B 21/003* (2013.01); *G10L 13/02* (2013.01)

(58) Field of Classification Search
CPC ....... G06F 3/017; G06F 3/048; G09B 21/003; G09B 21/005; G09B 21/004; G10L 13/02
See application file for complete search history.

(56) References Cited

U.S. PATENT DOCUMENTS

| | | | |
|---|---|---|---|
| 2012/0315606 A1* | 12/2012 | Jwa | G09B 21/003 434/114 |
| 2012/0315607 A1 | 12/2012 | Shin et al. | |
| 2013/0029297 A1* | 1/2013 | Tsai | G09B 21/003 434/114 |
| 2013/0157230 A1 | 6/2013 | Morgan | |
| 2013/0332827 A1* | 12/2013 | Smith | G09B 21/007 715/702 |
| 2015/0262509 A1* | 9/2015 | Labbe | G09B 21/004 434/113 |
| 2016/0019817 A1* | 1/2016 | Deokar | G09B 21/02 340/4.12 |

FOREIGN PATENT DOCUMENTS

| | | |
|---|---|---|
| JP | H11-232024 A | 8/1999 |
| KR | 10-2011-0063600 A | 6/2011 |
| KR | 10-2012-0063982 A | 6/2012 |
| KR | 10-2012-0065779 A | 6/2012 |
| KR | 10-2012-0136642 A | 12/2012 |
| KR | 10-2014-0010756 A | 1/2014 |
| KR | 10-2015-0123932 A | 11/2015 |
| KR | 10-2016-0097414 A | 8/2016 |

* cited by examiner

FIG. 4
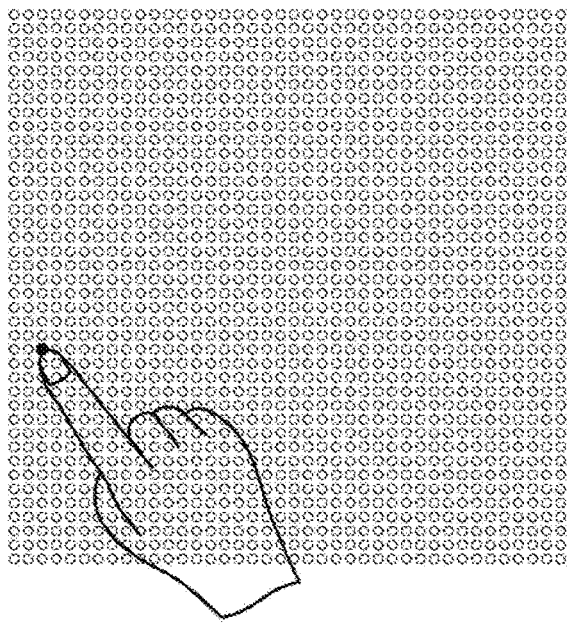
(A)
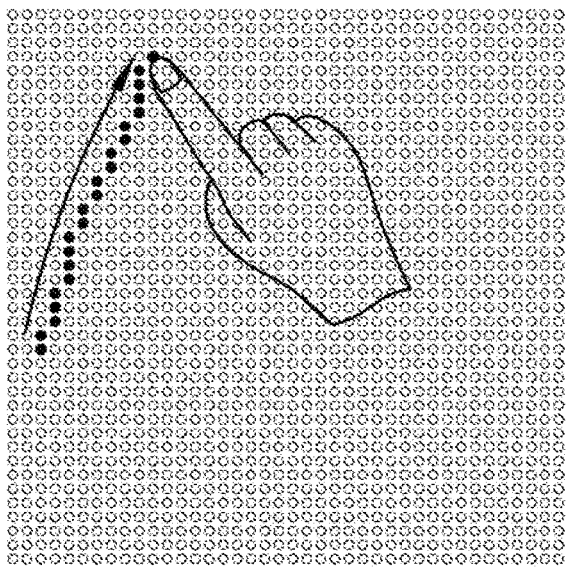
(B)
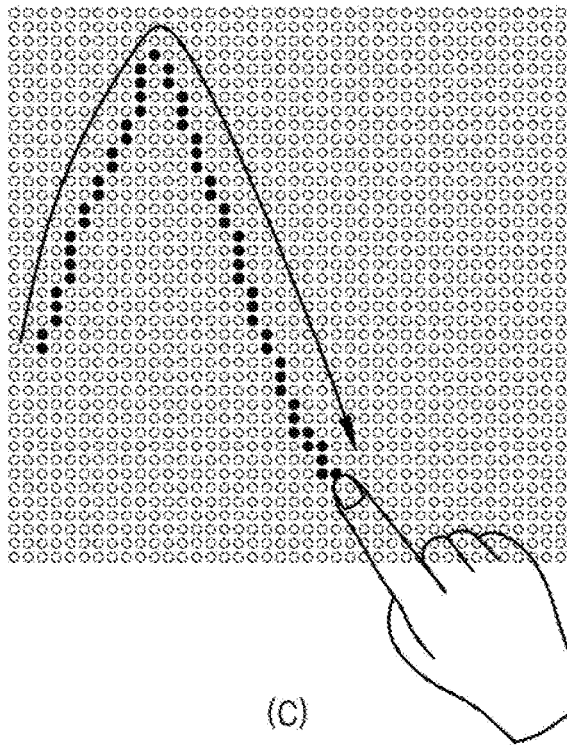
(C)
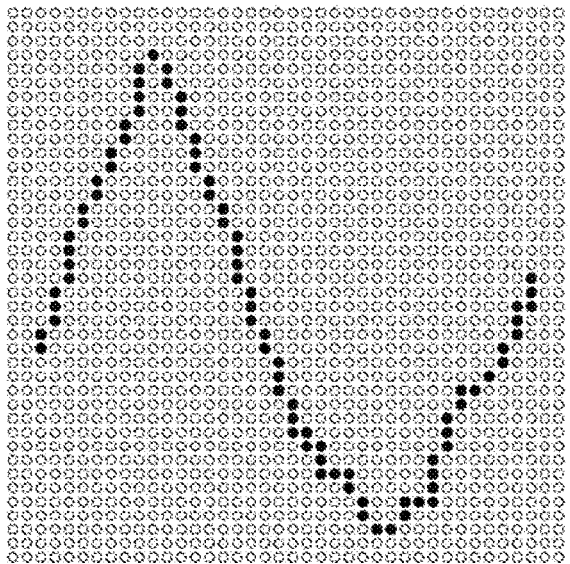
(D)

FIG. 13

| GUI elements | Visual design | Tactile icon |
|---|---|---|
| Button | Button | |
| Text label | Text label | |
| Text input box | Text box | |
| Folder | | |
| File | | |
| Title | HapticEditor | |
| Menu | Page control obje Next Page Previous Page | |

| Index | Tactile icon | Text |
|---|---|---|
| 1 | Title | |
| 2 | Menu 1 | Page control |
| 3 | Menu 2 | Next page |
| 4 | Menu 3 | Previous page |
| 5 | Menu 4 | Add page |
| 6 | Menu 5 | Remove page |
| 7 | Button | View all pages |
| | | Back |

FIG. 18
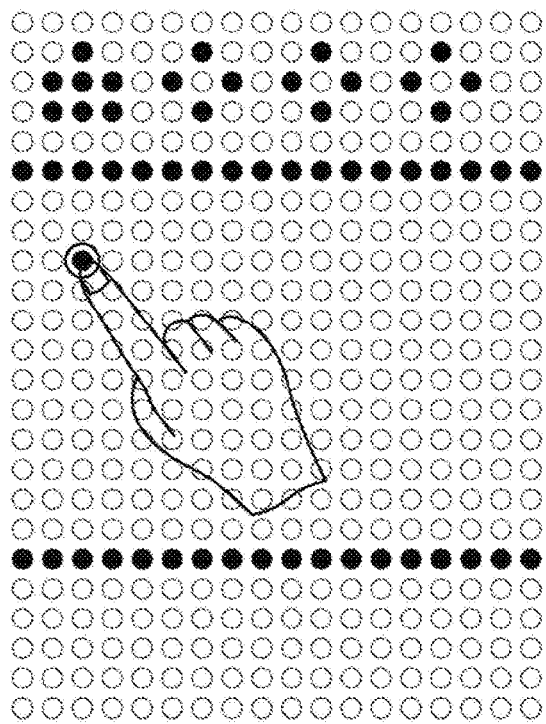
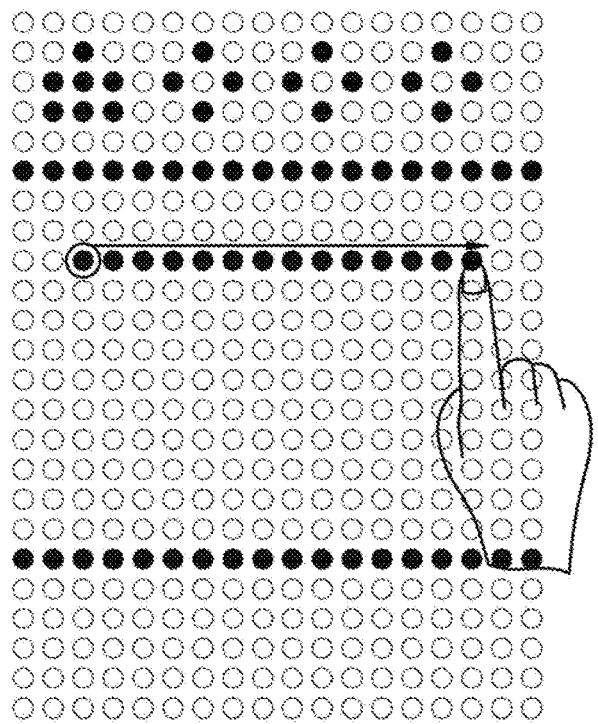
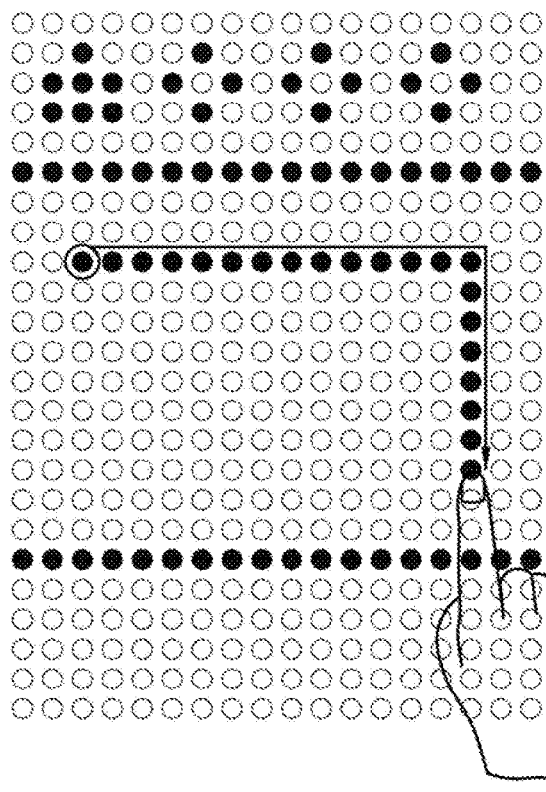
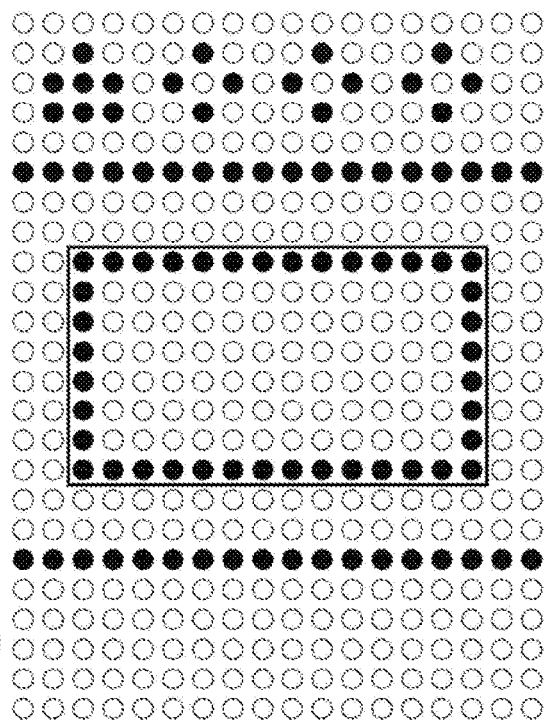

METHOD, DEVICE, AND COMPUTER-READABLE MEDIUM FOR CONTROLLING TACTILE INTERFACE DEVICE INTERACTING WITH USER

CROSS-REFERENCE TO RELATED APPLICATIONS

The present application is a continuation of International Patent Application No. PCT/KR2017/001189 filed Feb. 3, 2017, which is based upon and claims the benefit of priority to Korean Patent Application Nos. 10-2016-0048345 filed Apr. 20, 2016. The disclosures of the above-listed applications are hereby incorporated by reference herein in their entirety.

TECHNICAL FIELD

The present invention relates to a method, a device, and a non-transitory computer-readable medium for controlling a tactile interface device, and more particularly, to a novel method, a device, and a non-transitory computer-readable medium for controlling a tactile interface device and enabling those visually impaired to use a tactile sense in a manner similar to that of ordinary people using a computer so as to interact with a computer more intuitively and efficiently.

BACKGROUND ART

In the information society, it is essential to acquire and utilize information by using a computer, and such a trend is the same for the visually impaired as well as ordinary people.

In order to improve the level of informatization of the visually impaired, it is necessary to enable the visually impaired to acquire and utilize information at a level similar to that of the ordinary people, which is important in that daily lives of the visually impaired can be more convenient, and the visually impaired can acquire and utilize the information for themselves. In addition, ultimately, it may be very important in that the visually impaired are provided with various educational opportunities, thereby expanding opportunities for entering and participating the society, so that their welfare can be further improved.

However, a currently general way to use the computer is mainly to visually recognize visual information outputted through a monitor, and input information for the visual information by using an input tool such as a keyboard, a mouse, or a touch pad. Accordingly, there is a huge limitation in that the visually impaired who cannot use a vision recognizes output information of the computer and have an interaction such as an instant information input at a level the same as the ordinary people. As a result, the visual impairment significantly reduces the efficiency in using the computer, thereby depriving the visually impaired of the opportunity to acquire and utilize the information through the computer.

In order to solve the difficulty in using the computer of the visually impaired, various technologies have developed to recognize the visual information so as to interact with the computer by using hearing sense, tactile sense, or the like. As a representative technology, there is a screen reader which aids the visually impaired to use the computer through the hearing sense. The screen reader is a device or software for enabling the use of the computer by outputting, with a voice, the contents outputted on a computer screen and keyboard information inputted by the user.

However, because the screen reader searches graphical user interface (GUI) elements of the output screen by only using linearized information formed of one line without two-dimensional spatial position information with respect to the output screen, it is difficult to recognize the screen output information. In particular, the more information contained on the output screen, the greater the difficulty. In addition, because the screen reader only provides a text-based simple descriptive explanation with voice for various graphic information such as pictures and diagrams other than characters or the GUI elements, the visually impaired have big difficulty to understand and interact with the graphic information.

Another related art is a braille information terminal which delivers text information through the tactile sense by using braille cells. The braille information terminal is classified as a mode used as an independent device by providing several functions of the computer useful to the visually impaired, and a mode used as an auxiliary screen output device for outputting the text information on the computer screen analyzed by the screen reader in a braille manner. Both modes serve only as an alternate device that performs a few limited functions of the computer as a substitute for the computer, or serve only as an auxiliary output device for outputting the text information by using the braille, rather than serve as an interface for efficient interaction with the computer. In particularly, the braille information terminal specialized for outputting the braille, like the screen reader, cannot express the graphic information.

Technical Problem

The present invention provides a novel method, a device, and a non-transitory computer-readable medium for controlling a tactile interface device and enabling those visually impaired to use a tactile sense in a manner similar to that of ordinary people using a computer so as to interact with the computer more intuitively and efficiently.

SUMMARY

To solve the above problem, the present invention provides a method of controlling a tactile interface device implemented by a computing device including a processor and connected to the computing device to interact with a user, in which the method includes: an input information generating step of generating input information to an application being executed in the computing device based on an input at the tactile interface device; and an output information generating step of generating output information to the tactile interface device based on an output of a focus area among outputs from the application being executed in the computing device, in which the output information includes data for implementing a tactile graphic formed of a plurality of two-dimensional tactile pixels, and the input at the tactile interface device includes a touch input of the user.

In the present invention, the input information generating step may include an input category classifying step of classifying a category of an input from the tactile interface device; and an application input generating step of generating input information in a form that can be inputted to the application based on the input according to category of the input;

In the present invention, the category of the input may include a key input and a touch input.

In the present invention, when the category of the input is the touch input, the application input generating step may include a step of determining whether the touch input is matched with one of a plurality of preset gestures to generate an application input corresponding to the matched gesture.

In the present invention, when the category of the input is the touch input, the application input generating step may include a step of determining whether the touch input is not an input by a gesture but an input by input coordinates. When the touch input is the input of input coordinates, the input coordinates inputted from the tactile interface device may be converted into input coordinates in the application.

In the present invention, when the category of the input is the key input, the application input generating step may include a step of converting the key input into an input configured to be inputted into the application.

In the present invention, the output information generating step may include a step of generating tactile graphic data based on the display screen displayed in the focus area in the application, in which the tactile graphic may be implemented based on the tactile graphic data.

In the present invention, the output information generating step may include a change determining step of determining whether the display screen displayed in the focus area in the application is changed; and a tactile graphic converting step of generating tactile graphic data with respect to the display screen when the display screen is determined to be changed in the change determining step.

In the present invention, the tactile graphic converting step may include a focus partial area defining step of defining the focus area in the display screen outputted from the application into a focus partial area; and a tactile graphic element converting step of converting a display element of each focus partial area into a tactile graphic element according to a preset conversion rule.

In the present invention, the tactile graphic may include a plurality of layers, and at least one of the layers may display a tactile icon corresponding to an icon of executing an instruction for changing the display screen of the focus area among the outputs from the application.

In the present invention, the tactile graphic may include a plurality of layers, and the focus partial area may correspond to the layers.

In the present invention, the focus area may be decided by at least one of the previous inputs of the user.

In the present invention, the tactile graphic element converting step may include steps of a focus partial area deciding step of deciding a part of a graphic display outputted from the application as a focus area; a focus partial area defining step of defining the focus area into a plurality of focus partial areas; a tactile graphic element converting step of converting a display element of each of the focus partial areas into a tactile graphic element based on a preset conversion rule; and a tactile graphic data generating step of generating tactile graphic data for implementing the tactile graphic element in the tactile interface device.

In the present invention, the output information generating step may include a step of generating braille information expressed in the tactile interface device by a tactile pixel or sound information reproduced in the tactile interface device by the tactile interface device, based on detailed information of the tactile graphic element corresponding to the input coordinates by the touch input of the user, in which the output information to the tactile interface device may include the braille information or the sound information.

Advantageous Effects

According to an embodiment of the present invention, tactilely displayed articles can be intuitively perceived by the visually impaired in real time.

According to an embodiment of the present invention, the visually impaired can immediately perform the input while perceiving information in a tactile manner and depending on the perceived information.

According to an embodiment of the present invention, the visually impaired can recognize the screen output information of the computer in the form of braille, voice and tactile graphics and instantly and intuitively input information, based a tactile display capable of a touch and a gesture recognition, thereby efficiently using the computer in a way very similar to the ordinary people.

According to an embodiment of the present invention, various functions of an operating system (OS) and various application software can be easily expanded for use.

According to an embodiment of the present invention, the remarkably improved operation performance speed and the convenience can be provided to a visually impaired person compared to the conventional device such as a screen reader.

According to one embodiment of the present invention, the visually impaired can conveniently perform graphic-related tasks that are difficult to be performed by a screen reader.

According to one embodiment of the present invention, the visually impaired also can use a program such as 'Paint' which is an auxiliary program of WINDOWS™. The visually impaired can input a picture including a line through the second layer, perceive the picture drawn by the visually impaired by using the tactile sense in real time, and complete the picture based on the perceived picture information.

According to an embodiment of the present invention, the computer literacy ability of the visually impaired can be remarkably improved, and the market of computer hardware and software for the visually impaired can be expanded.

BRIEF DESCRIPTION OF DRAWINGS

FIG. 4 is a perspective view illustrating a tactile display unit according to an embodiment of the present invention. FIG. 4 is a view illustrating a usage example of a tactile interface device according to an embodiment of the present invention.

FIG. 13 is a schematic view illustrating a table of tactile icons according to an embodiment of the present invention.

FIG. 18 is a schematic view illustrating a procedure when the visually impaired draws a picture by using a tactile interface device according to an embodiment of the present invention.

DETAILED DESCRIPTION

Figure 1:
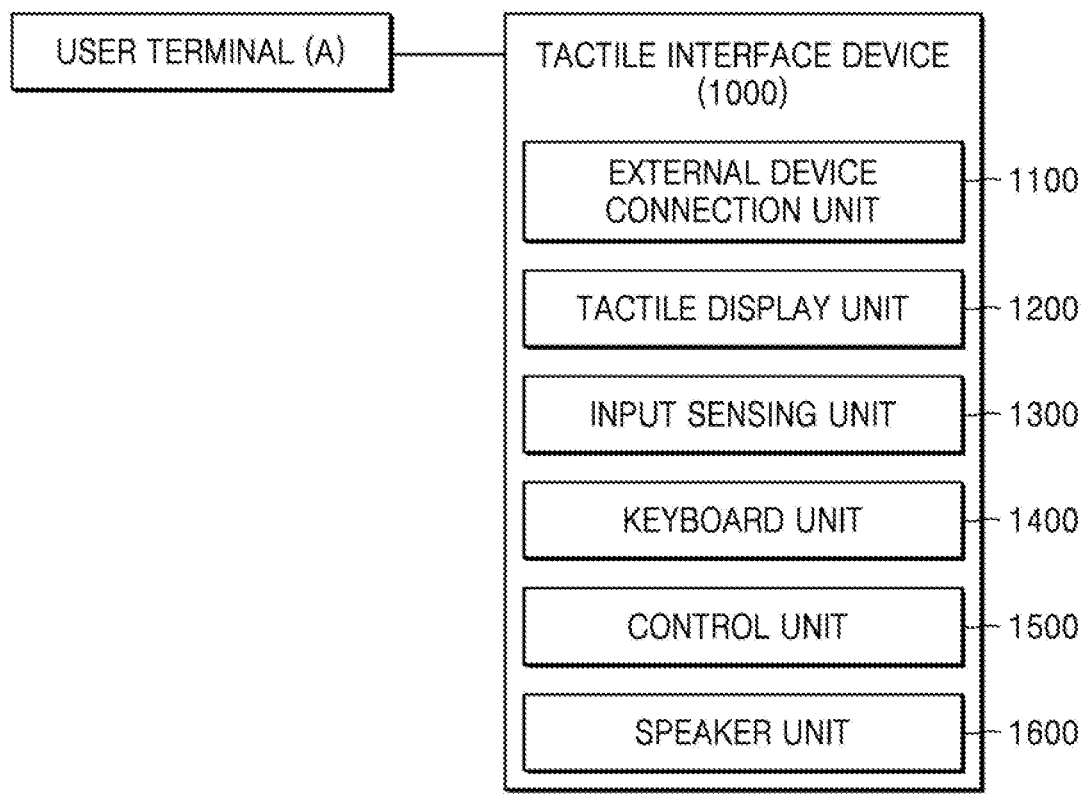
FIG. 1 is a schematic view illustrating an internal structure of a tactile interface device and a user terminal according to an embodiment of the present invention.

The aspects, features and advantages of the present application will be understood with reference to the following embodiments and the accompanying drawings. Same reference numerals in different drawings may indicate the same or similar elements. In addition, the following description is not intended to limit the invention, and the scope of the present invention will be defined by the appended claims and their equivalents.

Tactile Interface Device

Hereinafter, an example of a tactile interface device to be controlled in a method, a device, and a non-transitory computer-readable medium according to the present invention will be described.

FIG. 1 is a schematic view illustrating an internal structure of a tactile interface device 1000 and a user terminal according to an embodiment of the present invention.

As shown in FIG. 1, the tactile interface device 1000 is configured to be connected to a user terminal A in a wired or wireless manner so as to transmit and receive data. For example, the tactile interface device 1000 may receive a graphic signal from the user terminal A to provide tactile information. However, according to the present invention, unlike FIG. 1, the tactile interface device 1000 itself may be operated by an independent operating system without an external user terminal, and the tactile interface device 1000 may be operated by an operation based on a program and an internal memory inside the tactile interface device 1000. However, even in the above case, the tactile interface device 1000 may be provided with a communication function.

Meanwhile, the user terminal A may include a smart phone, a tablet, a personal computer (hereinafter referred to as "PC"), a mobile phone, a videophone, an e-book reader, a desktop PC, a laptop PC, a netbook PC, a personal digital assistant (hereinafter referred to as "PDA"), a portable multimedia player (hereinafter referred to as "PMP"), an mp3 player, a portable medical device, a camera, a wearable device such as a head-mounted device (hereinafter referred to as "HMD"), an electronic garment, an electronic bracelet, an electronic necklace, an electronic appcessory, an electronic tattoo, and a smart watch.

Figure 3:
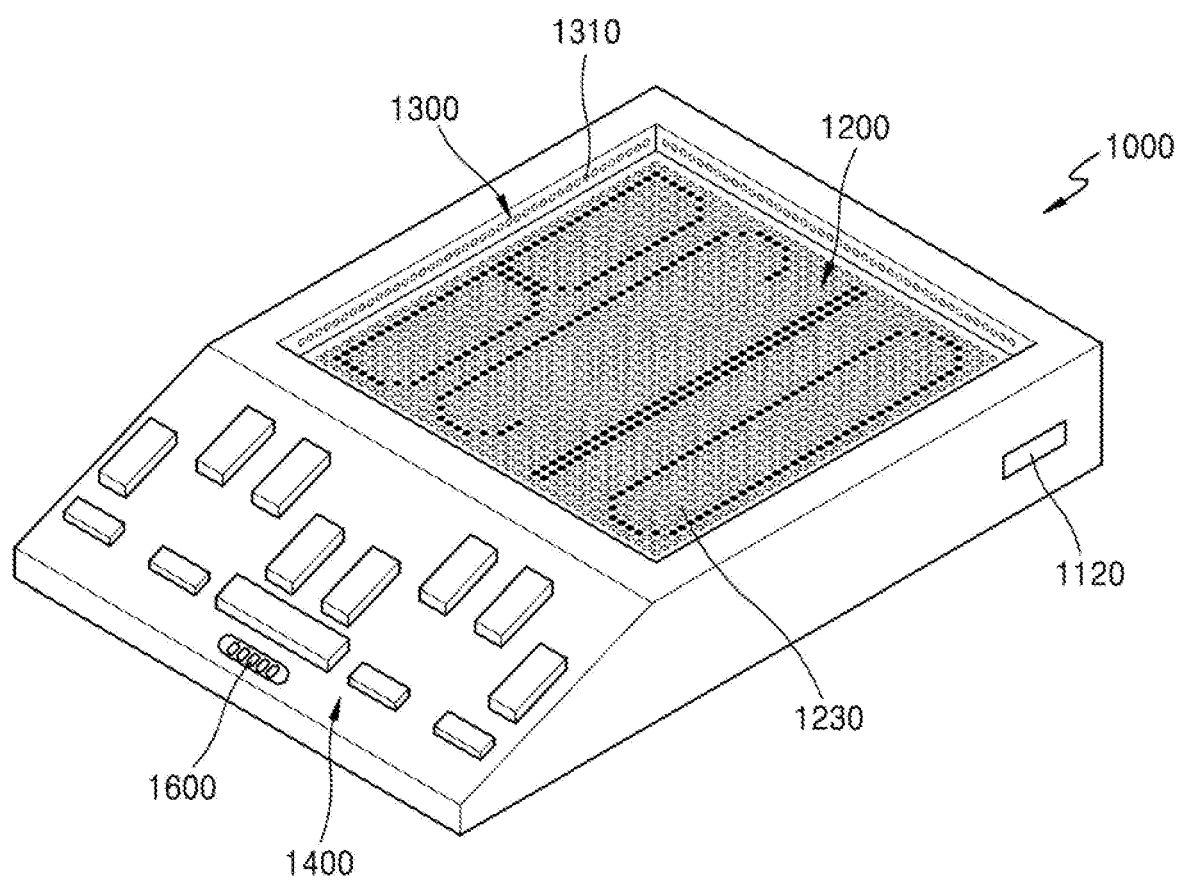
FIG. 3 is a perspective view illustrating a tactile interface device according to an embodiment of the present invention.

As shown in FIG. 1 or FIG. 3, the tactile interface device 1000 according to an embodiment of the present invention includes an external device connection unit 1100, a tactile display unit 1200, an input sensing unit 1300, a keyboard unit 1400, a control unit 1500, and a speaker unit 1600. The tactile display unit 1200 converts a visual graphic outputted from a monitor by a computer into a tactile graphic and outputs the converted tactile graphic.

The input sensing unit 1300 may be coupled to the tactile display unit 1200. The input sensing unit 1300 recognizes tactile information outputted from the tactile display unit 1200 or finger touches of the visually impaired and various predetermined gestures with respect to the tactile graphic and transmits the inputted signals to the computer. The keyboard unit 1400 may include a braille keyboard for transmitting a character input signal to the computer by converting braille characters commonly used by the visually impaired into ordinary characters.

The braille keyboard, like the traditional braille keyboard, receives the braille and transmits the braille to the tactile interface device 1000 or the user terminal connected to the tactile interface device 1000. The braille keyboard consists of one to six points, backspace, space and enter buttons. Because the braille is formed of several dots to form a single letter, the braille keyboard can transmit information on simultaneously pressed buttons. The transmitted braille information is braille-translated into the general character through software inside the tactile interface device 1000 or software in the user terminal.

Accordingly, for the purpose of a computer input/output function for the visually impaired, the tactile display unit 1200 serves the same role as a monitor of a general computer, the input sensing unit 1300 functions as a touch screen of a mouse or a tablet PC, and the keyboard unit 1400, preferably the braille keyboard, functions as a keyboard of the general computer.

Figure 2:
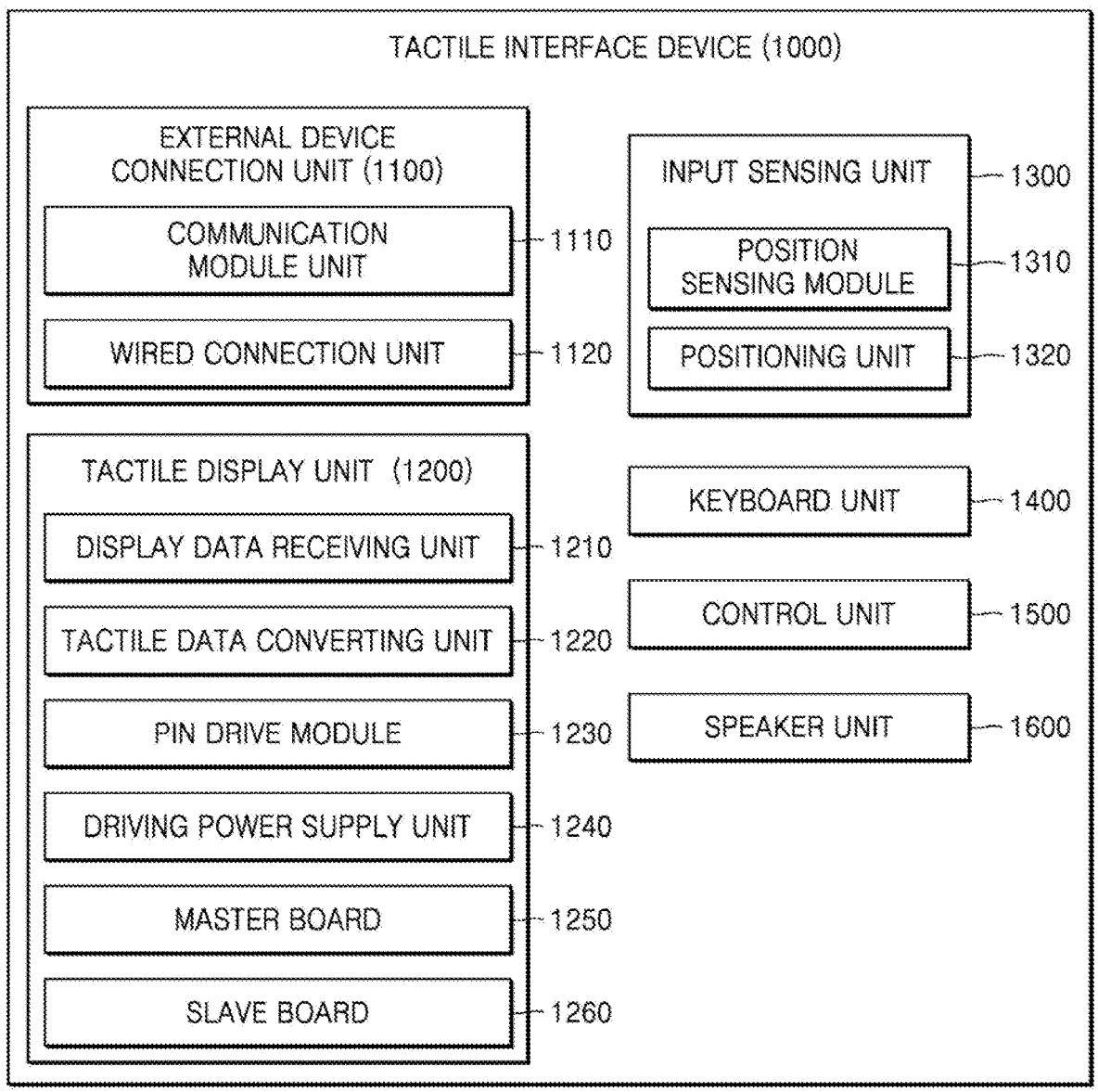
FIG. 2 is a schematic view illustrating an internal structure of a tactile interface device according to an embodiment of the present invention.

FIG. 2 is a schematic view illustrating an internal structure of a tactile interface device 1000 according to an embodiment of the present invention.

The tactile interface device 1000 according to an embodiment of the present invention includes: a tactile display unit 1200 for providing tactile information to the user through a plurality of pins based on data received from a connected external device or data generated in the tactile interface device 1000; an input sensing unit 1300 for sensing an input of the user; an external device connection unit 1100 connected to an external device; a keyboard unit 1400 for receiving information from the user in the form of a key input; a speaker unit 1600 for outputting sounds to the outside; and a control unit 1500 for controlling operations of the tactile display unit 1200, the input sensing unit 1300, the external device connection unit 1100, the keyboard unit 1400, and the speaker unit 1600.

The tactile display unit 1200 may provide the tactile information by using a tactile pixel having at least one dimension, and the tactile pixel may include a plurality of pins moved up and down by applying power to a transducer including a piezoelectric ceramic and an elastic body. Preferably, the tactile pixel provides the tactile information in two dimensions.

The above tactile display unit 1200 includes: a display data receiving unit 1210 for depending on data received from the external user terminal, or receiving data generated in the tactile interface device 1000; a tactile data converting unit 1220 for converting the data into tactile display data; a plurality of pin drive modules 1230 driven by the tactile display data; and a driving power supply unit 1240 for receiving power for driving the tactile display unit 1200, in which the tactile display unit 1200 provides the tactile information or the tactile graphic based on the received data.

The input sensing unit 1300 emits a plurality of lights, senses the emitted lights, and senses a user input from position information of the light having a sensed value changed when a sensed value of the emitted light changes due to a physical interception.

Specifically, the input sensing unit 1300 includes a position sensing module 1310 and a positioning unit 1320, in which the position sensing module 1310 includes a plurality of optical emitters and a plurality of light receiving sensors, and the positioning unit 1320 senses a user input from sensing data of the light receiving sensors.

The light used in the input sensing unit 1300 may be infrared rays, and the light may be emitted onto a predetermined cross section.

The input sensing unit 1300 may be disposed adjacent to, or more preferably, coupled to the tactile display unit 1200 or the pin drive module 1230 of the tactile display unit 1200. Accordingly, the user may recognize the tactile information or the tactile graphic provided from the tactile display unit 1200 through a tactile sense, and immediately perform an input, a gesture or the like on the tactile display.

However, in order to prevent the finger of the user from coming into strong contact with the pin drive module 1230 of the tactile display unit 1200 and causing a damage to the pin drive module 1230 when the user performs the input into the input sensing unit 1300, the position sensing module 1310 of the input sensing unit 1300 may be spaced apart from the pin drive module 1230. Alternatively, an area that the user can perform the input into the input sensing unit 1300 may be spaced apart from an operation area of the pin drive module 1230. Alternatively, the area that the user can perform the input into the input sensing unit 1300 may be disposed at a height higher than the height when the pin drive module 1230 is lifted.

In addition, the optical emitters may be arranged along a first axis and a second axis, and the light receiving sensors may be arranged along the first axis and the second axis. More preferably, the light receiving sensors may be arranged to correspond to the light emitters.

The external device connection unit 1100 includes at least one of a communication module unit 1110 for performing wireless communication and a wired connection unit 1120 accessed to the external device through an wire. The communication module unit 1110 includes at least one of a bluetooth communication module, a Zigbee communication module, an infrared communication module, a bluetooth low energy (BLE) communication module, an audio communication module, a long term evolution (LTE) communication module, a WiFi communication module, an IrDA-based infrared communication module, a wireless LAN (WLAN), a WiBro module, and a wireless USB module. In addition, the wired connection unit 1120 may include a connection module using a universal serial bus (USB) interface, as well as a wired connection module capable of transmitting and receiving data.

The speaker unit 1600 may perform, with voice, a function of reading out information outputted in response to information tactilely displayed on the tactile interface device 1000, character information, or information inputted by the input sensing unit 1300.

The control unit 1500 controls overall operations of the tactile interface device, or operations of the external device connection unit 1100, the keyboard unit 1400, or the speaker unit 1600. For example, when data is received from the external user terminal, the data is transmitted to the display data receiving unit 1210 of the tactile display unit 1200, and an operation of the tactile display unit 1200 is instructed. Alternatively, when an input of the use is inputted from the input sensing unit 1300, the input is processed by the control unit 1500 or an input signal is transmitted to the user terminal A connected through the external device connection unit 1100.

When being operated by its own OS and application other than the connection with the external user terminal, the tactile display device may include a CPU and a memory device at a level of being capable of its own operation and operate independently. Even though being operable independently, the tactile display device also may perform communication with the outside.

FIG. 3 is a perspective view illustrating a tactile interface device 1000 according to an embodiment of the present invention.

As shown in FIG. 3, the tactile interface device 1000 according to the present invention provides a tactile display in a pixel type by using components of the tactile display unit 1200 exposed to the outside, in particular, by the pin drive modules 1230. The user may tactilely recognize the pin drive modules 1230 of the tactile display unit 1200 by the above tactile display unit 1200.

Meanwhile, the user can input a command or the like through the input sensing unit 1300 by using the touch input while recognizing the tactile display by using the tactile sense. Herein, the 'touch input' is not interpreted narrowly but includes an input performed while an uppermost pin of the pin drive module of the tactile display unit is touched, and an input performed while the uppermost pin of the pin drive module is not touched.

In order to prevent the finger of the user from coming into strong contact with the pin drive module 1230 of the tactile display unit 1200 and causing a damage to the pin drive module 1230 when the user performs the input into the input sensing unit 1300, the input sensing unit 1300 of the present invention may use a non-contact type recognition based on optical sensing, more preferably infrared sensing, so that actions, inputs, gestures, and the like are recognized regardless of touches with respect to tactile pins, unlike the electrostatic capacity type used in a typical touch display to detect changes in an electrostatic capacity on a surface of a tactile pin. In other words, the input sensing unit is performed in a non-contact type.

Herein, the non-contact type sensing or the non-contact type recognition refers to a sensing scheme for enabling a sensing element or a sensor to recognize a physical action or a physical form without physically touching the sensing element or the sensor. As an example, a recognition scheme based on an infrared sensing is used according to an embodiment of the present invention.

In addition, as shown in FIG. 3, an area that the user can perform the input into the input sensing unit 1300 may be spaced apart from the operation area of the pin drive module 1230. Alternatively, the area that the user can perform the input into the input sensing unit 1300 may be disposed at a height higher than the height when the pin drive module 1230 is lifted.

Meanwhile, the user may input information into the tactile interface device 1000 through the keyboard unit 1400 so as to input specific information, for example, to input text information.

In addition, the tactile interface device 1000 may output voice information to the user through the speaker unit 1600 to output voice or sound information of the text to the user.

As shown in FIG. 3, the tactile interface device 1000 may be connected to the external user terminal through the wired connection unit 1120, or connected to the external user terminal through the communication module unit 1110 by using the wireless communication. In the above case, the GUI elements in the user terminal may be tactilely displayed on the tactile interface device 1000, and the user may input a response or input with respect to the GUI elements through the input sensing unit 1300 or a keyboard. In addition, the tactile display device 1000 may perform an output through the tactile display unit 1200 or the speaker unit 1600 according to an instruction inputted by the user through the input sensing unit 1300, such that the visually impaired may use a user terminal such as a graphic screen-based PC more intuitively.

In addition, the above tactile interface device 1000 can enable the visually impaired not only to simply recognize the tactile information, but also to recognize the tactile information and therefore intuitively perform an input such as an instruction to the tactile interface device 1000, such that, as a result, the user terminal such as the graphic screen-based PC can be used conveniently as same with the ordinary people.

FIG. 4 is a view illustrating a usage example of the tactile interface device 1000 according to an embodiment of the present invention.

As shown in FIG. 4, according to one embodiment of the present invention, the pin is lifted in real time according to finger movements so that a free drawing function for freely drawing a graphic is performed. The user may easily draw the graphic while easily recognizing the previously drawn graphic by checking tactile display or tactile information in real time.

Accordingly, the tactile display device according to one embodiment of the present invention may enable the visually impaired to interact with a computer more easily and intuitively by using the tactile sense, in a very similar way to usual computer usage in which a normal person having normal vision perceives visual information through a monitor and enters information through a mouse (or a touch screen of a tablet PC) and a keyboard.

The above-mentioned tactile interface device is described as a tactile interface device to be used as an example in the method, the device, and the non-transitory computer-readable medium for controlling the tactile interface device which are described as below. The description of the method, the device, and the non-transitory computer-readable medium for controlling the tactile interface device is not limited to the above-mentioned description, and shall be understood in the broadest meaning according to the claims of the invention.

A method, a device, and a non-transitory computer-readable medium for controlling a tactile interface device Hereinafter, the method, the device, and the non-transitory computer-readable medium for controlling the tactile interface device according to the present invention will be described.

Figure 5:
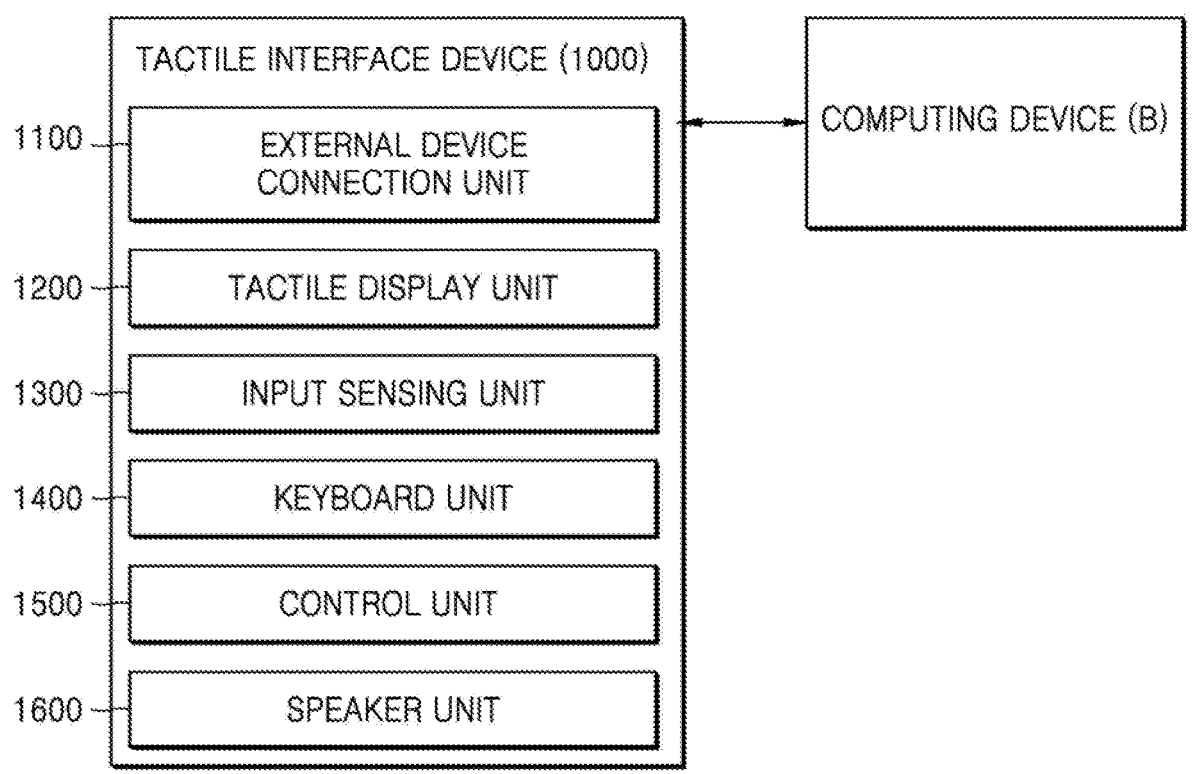
FIG. 5 is a schematic view illustrating a connection example between a tactile interface device and a computing device for controlling the tactile interface device according to an embodiment of the present invention.

FIG. 5 is a schematic view illustrating a configuration of a tactile interface device and a computing device for controlling the tactile interface device according to an embodiment of the present invention.

Although FIG. 5 shows that the tactile interface device 1000 connected to a computing device B has components the same as the tactile interface device, this is just one example, and the present invention is not limited thereto. The tactile interface device connected to the computing device B for controlling the tactile interface device according to the present invention, which is described hereinafter, includes all of any interface device capable of providing the tactile graphic, the tactile interface device capable of interacting with the user, and the computing device B capable of outputting the tactile graphic.

As shown in FIG. 5, the computing device B is connected to the tactile interface device, and the above a connection includes both a wired connection and a wireless connection.

The computing device B may correspond to the above-described user terminal A shown in FIG. 1. The computing device B may include a smart phone, a tablet, a personal computer (hereinafter referred to as "PC"), a mobile phone, a videophone, an e-book reader, a desktop PC, a laptop PC, a netbook PC, a personal digital assistant (hereinafter referred to as "PDA"), a portable multimedia player (hereinafter referred to as "PMP"), an mp3 player, a portable medical device, a camera, a wearable device such as a head-mounted device (hereinafter referred to as "HMD"), an electronic garment, an electronic bracelet, an electronic necklace, an electronic appcessory, an electronic tattoo, a smart watch, or the like.

The above computing device B may include at least one processor and memory, and may be selectively connected to a display device such as a monitor or provided therein with a display module.

Alternatively, the computing device B may be in a form combined to the tactile interface device. In the above case, the tactile interface device and the computing device B for controlling the tactile interface device may be recognized as a single device from the viewpoint of the user. In the case of the above combined type device, the computing device B and the tactile interface device may be in the form of sharing the processor and the memory.

Figure 6:
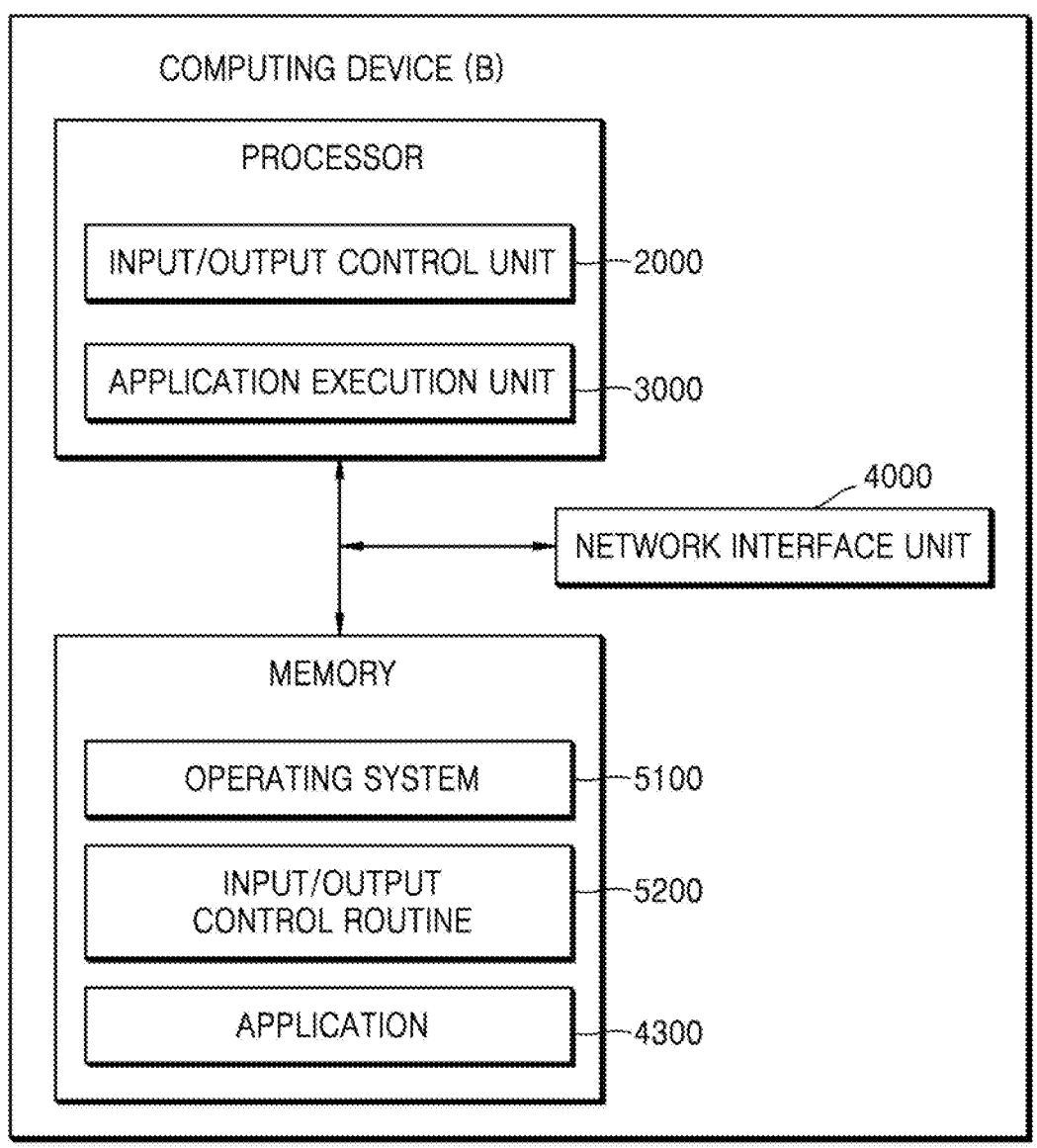
FIG. 6 is a schematic view illustrating a computing device for controlling a tactile interface device according to an embodiment of the present invention.

FIG. 6 is a schematic view illustrating an internal structure of a computing device for controlling a tactile interface device according to an embodiment of the present invention.

The computing device for controlling the tactile interface device according to an embodiment of the present invention may include a processor, a network interface, a memory, and a bus (corresponding to a bi-directional arrow between the processor, the memory, and the network interface). The memory may include an operating system 5100, an input/output control routine 5200, and an application 5300. The processor may include an input/output control unit 2000 and an application execution unit 3000. In other embodiments the computing device for controlling the tactile interface device may include components more than components of FIG. 6.

The memory is a computer-readable recording medium, and may include a permanent mass storage device such as a random access memory (RAM), a read only memory (ROM), and a disk drive. In addition, a program code for the operating system 5100, input/output control routine 5200, and application 5300 may be stored in the memory. The above software components may be loaded from a recording medium which is readable in an additional computer other than the memory by using a drive mechanism (not shown). The above recording medium readable in the additional computer may include a computer-readable recording medium (not shown) such as a floppy drive, a disk, a tape, a DVD/CD-ROM drive, and a memory card. In other embodiments, the software components may be loaded into the memory via the network interface unit 4000 other than the computer-readable recording medium.

The bus may enable communication and data transmission between the components of the computing device for controlling the tactile interface device. The bus may be configured by using a high-speed serial bus, a parallel bus, a storage area network (SAN), and/or other suitable communication technologies.

The network interface unit 4000 may be a computer hardware component for connecting the computing device for controlling the tactile interface device to a computer network. The network interface unit 4000 may connect the computing device for controlling the tactile interface device to the computer network via a wireless or wired connection. Via the above network interface unit 4000, the computing device for controlling the tactile interface device may be connected to the tactile interface device in a wireless or wired manner.

The processor may be configured to process an instruction of the computer program by performing a basic calculation and logic, and an input/output operation of a computing device for controlling the tactile interface device. The instruction may be provided to the processor by the memory or the network interface unit 4000 and via the bus. The processor may be configured to execute program codes for the input/output control unit 2000 and the application execution unit 3000. The above program codes may be stored in a recording device such as the memory.

The input/output control unit 2000 and the application execution unit 3000 may be configured to perform the method of controlling the tactile interface which is described hereinafter. In the above processor, according to the method of controlling the tactile interface device, some components may be omitted, additional components not shown may be further included, or at least two components may be combined.

Figure 7:
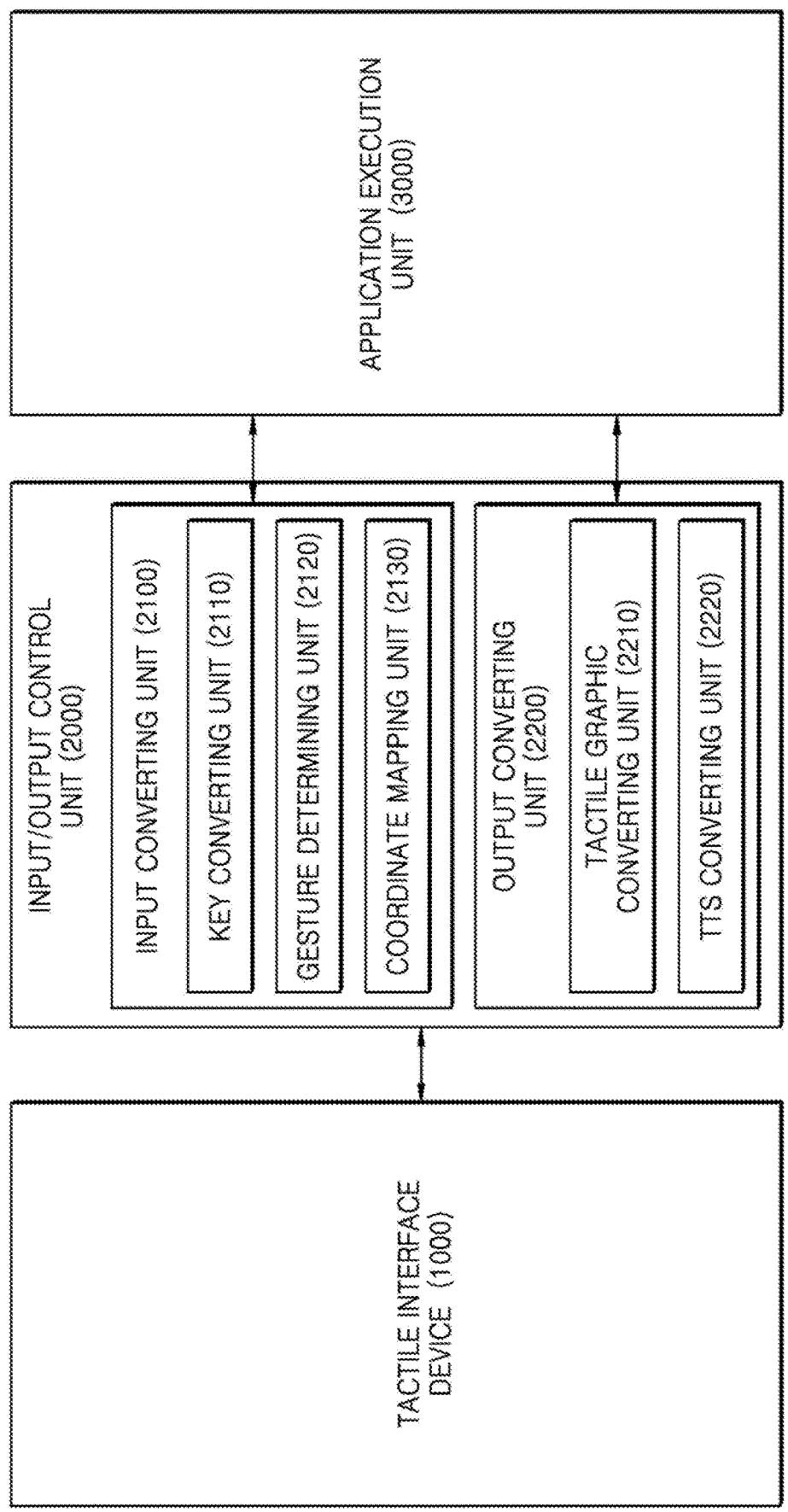
FIG. 7 is a schematic view illustrating an internal structure of a partial component of a computing device for controlling a tactile interface device according to an embodiment of the present invention.

FIG. 7 is a schematic view illustrating an internal structure of a partial component of a computing device for controlling a tactile interface device according to an embodiment of the present invention.

The computing device B according to the present invention includes the input/output control unit 2000 for controlling a mutual input/output between the application execution unit 3000 and the tactile interface device.

The application execution unit 3000 is a term indicating a module capable of executing an application for performing functions provided in the OS by default (such as Explorer in WINDOWS™), an application for performing functions provided in the OS subsidiarily (such as Notepad and Paint in WINDOWS™), an application installed separately from the OS for performing independent functions (such as MS WORD™), an application that performs independent functions executed on the Web, and an application operated only in an app of a smart phone or a specific device. In other words, the application execution unit 3000 inclusively denotes a module that executes programs having executable instructions.

An ordinary user may execute the above application in the computing device B and interact with the application by using a mouse, a keyboard, a monitor, a touch pad, or the like, however, the above usual devices are interacted based on graphic information that is difficult to be recognized by the visually impaired.

In the present invention, the interface or the input/output of the application executed by the application execution unit 3000 is converted and controlled in the form to be used by the visually impaired so as to enable the visually impaired to use the application executed by the application execution unit 3000 of the computing device B.

In addition, the method of controlling the tactile interface device of the present invention may be applied not only for the purpose of the visually impaired but also for an input/output system and a PC utilizing tactile information to be subsidiarily used in other devices such as a vehicle or a flight device.

According to an embodiment of the present invention, the input/output control unit 2000 converts the input/output of the application executed in the application execution unit 3000 into a form that can be used by the visually impaired, and implements the converted input/output in the tactile interface device, and the user can use the application more intuitively and conveniently through the tactile interface device.

Particularly, because the tactile interface device 1000 is a device capable of transmitting information to the user by using the tactile information, and receiving information or instructions from the user through a tactile input or touch input, the visually impaired can use the application without inconvenience.

As shown in FIG. 7, the input/output control unit 2000 includes an input converting unit 2100 for converting an input from the tactile interface device into an input to the application execution unit 3000; and an output converting unit 2200 for converting an output from the application execution unit 3000 into an output of the tactile interface device.

Preferably, according to the device for controlling the tactile interface device of an embodiment of the present invention, the information inputted from the tactile interface device is converted into a form usable in the application execution unit 3000 to input the converted information to the application execution unit 3000 may be performed in addition to an operation of displaying the output information from the application execution section 3000 in a tactile display form.

In other words, according to the present invention, the user does not passively receive information but inputs information based on recognized information, and the input/output control unit 2000 converts the above inputted information into a form that can be input to the application execution unit 3000, thereby enabling the visually impaired user to use the application executed in the application execution unit 3000 at a level similar to that of the usual user. As shown in FIG. 4, according to the present invention, an operation of the input/output control unit 2000 enables even the visually impaired to tactilely use an application for drawing a picture.

Meanwhile, the input converting unit 2100 includes a key converting unit 2110 for converting a key input inputted from the tactile interface device into a form that can be inputted to the application execution unit 3000; a gesture determining unit 2120 for converting the touch input inputted from the tactile interface device into a form configured to be inputted into the application execution unit 3000; and a coordinate mapping unit 2130 for converting input coordinates inputted by a touch input or the like in the tactile interface device into input coordinates in the application execution unit 3000;

Preferably, the input received from the tactile interface device and converted by the key converting unit 2110 is information inputted by braille, direction key, shortcut key, and the like.

The input converted by the key converting unit 2110 may be an input by a braille keyboard that converts a braille character generally used by the visually impaired into a usual character and transmits a character input signal to the computer.

The braille keyboard of the present invention receives the braille and transmits the braille to the tactile interface device or a user terminal connected to the tactile interface device, as the conventional braille keyboard generally used. The braille keyboard consists of one to six points, backspace, space, and enter buttons. The braille consists of several dots to form one character, so the braille keyboard transmits information of simultaneously pressed buttons, wherein the key converting unit 2110 translates the input of the braille keyboard into a general character.

Meanwhile, the gesture determining unit 2120 determines whether the touch input corresponds to one of the preset gestures. When the touch input is determined as the gesture, the gesture determining unit 2120 converts the touch input into a command corresponding to the determined gesture. The command is inputted into the application execution unit 3000.

Herein, the touch input refers to a type of an input including an input by non-contact type optical-based sensing, an input by touch recognition through electrostatic capacity changes generally used in a tablet PC, smart phone, or the like. In other words, the touch input includes all types of inputs directly inputted by a body of the user other than the key input type.

Herein, Table 1 shows examples of the preset gesture as below.

TABLE 1

| Gesture Type | Application Input |
| --- | --- |
| Single tap | Output a type and a text of a touched GUI element into a braille and a voice |
| Double tap | Same function as a double click of a mouse |
| Long tap after tap | Same function as a right click of a mouse |
| Panning after tap | Scroll up/down/left/right |
| Drawing circle after tap | Zoom in (clockwise)/Zoom out (counterclockwise) |

The interaction between the tactile interface device and the electronic device may be primarily performed through the gesture recognition function of the touch input. It is preferable that a specific operation is recognized by defining various touch operations as shown in Table 1, and then the specific operation is transmitted to the application execution unit 3000 of the computing device as an input signal, so that a familiar and intuitive computer operation is provided to the visually impaired.

For example, a single tap gesture enables a type of a GUI element and a corresponding text to be outputted into a braille and a voice with respect to a tactile icon at a touched position. For example, the visually impaired person recognizes the tactile icon, which is recognized by a tactile graphic, through a finger action (swipe) and performs the single tap gesture on the tactile icon, so that a focus is shifted to the corresponding GUI element. In addition, the above tab gesture may output the detailed information, such as text information, of the selected GUI element into the braille on one of the layers for displaying the tactile graphic of the tactile interface device, and also output the detailed information into a TTS-based voice.

The Double tab, long tap after tap, panning after tap, and drawing circle after tap, which correspond to the remaining gestures in Table 1, are defined as performing a tab once which is followed by tap, long tap, panning, and drawing the circle gestures, respectively, such that the visually impaired person is prevented from being confused between the finger swipe action for recognizing the tactile graphics and the defined gestures. The double tap gesture refers to quickly touching the same position twice and has the same function as a left double click of the mouse to execute a default action of the GUI element. The long tap after tap gesture refers to performing a tap once and tapping the same position while touching continuously for a predetermined period of time, and has the same function as a right click of the mouse. The panning after tap gesture refers to performing a tap once and touching the same position again while perform a panning operation, and has a function of scrolling up/down/left/right according to the panning direction. The drawing circle after tap gesture refers to performing a tap once and quickly touching the same position again while drawing a circle, and has a function of enlarging a screen when the circle is drawn in the clockwise direction and a function of reducing the circle when the circle is drawn in the counterclockwise direction.

Meanwhile, the coordinate mapping unit 2130 is configured to convert the input coordinates or a cursor position in the tactile interface device into the input coordinates in the application execution unit 3000 through the touch input in the tactile interface device or a key input of a direction key. The input coordinates or the cursor position may be generated or changed by the input of the direction key of the tactile interface device or the touch input.

As described hereinafter, when the computing device is a PC, tactile icons are implemented in the tactile graphic which is outputted after reconfiguring the GUI elements of a monitor display screen of the PC. The above tactile icons do not spatially one-to-one match with the monitor display screen. Therefore, when focusing is specifically performed in the tactile interface device (when focusing is performed more specifically in the focusing area described later), or when the input coordinates where the cursor is located is used without change, the application execution unit 3000 of the computing device cannot recognize where the event comes from among the GUI elements.

Preferably, the coordinate mapping function of the coordinate mapping unit 2130 may be a function to map a tactile icon object currently being outputted as the tactile graphic with the GUI element displayed on the monitor display screen when the application execution unit 3000 is actually driven, in which the coordinate mapping unit 2120 maps the recognized coordinates by constituting a mapping table.

The tactile graphic displayed on the tactile interface device and the display screen upon normally executing the application execution unit 3000 may be different from each other in resolution, configuration, and position. In the above case, the input coordinates in the tactile interface is required to be converted or mapped to the input coordinates in the application execution unit 3000 so as to input the instruction inputted from the tactile interface device to the application execution unit 3000 without limitation, in which the converting or mapping is performed by the coordinate mapping unit 2130. By the above coordinate mapping unit 2130, the user may use the function of the application execution unit 3000 at a level of the usual user without reducing or simplifying the function of the application execution unit 3000.

For example, when the user performs a gesture (double tap) or a key input related to the execution at a point corresponding to the 'A' in the tactile interface device in order to execute an instruction 'A' in the application execution unit 3000 (for example, when the user opens a My Documents folder in the Windows desktop screen) (see Table 1), the coordinate mapping unit 2130 may map the coordinates at the point in the tactile interface device to the coordinates of the icon 'A' of the connected application execution unit 3000, and thus, the 'A' instruction in the application execution unit 3000 may be executed.

Accordingly, the input converting unit 2100 may perform a touch gesture recognition function for recognizing a gesture to the touch input of the tactile interface device, a coordinate mapping function for informing a GUI element corresponding to touch coordinates inputted from the touch recognition device, and a reverse braille translation function for converting the braille information inputted from the braille key into ordinary characters.

Meanwhile, the output converting unit 2200 includes a tactile graphic converting unit 2210 for converting a focus area corresponding to a part or whole of the display screen outputted from the application execution unit 3000 into the tactile graphic data, and the tactile graphic provided by the tactile interface device may be implemented from the tactile graphic data.

In the present specification, the "display screen" denotes a concept including a visual screen outputted to a usual visual display device such as a monitor by the application, and a visual element included in the visual screen.

Meanwhile, the output converting unit 2200 further includes a TTS converting unit 2220 for converting the information outputted from the application execution unit 3000 into voice information. Preferably, the TTS converting unit 2220 converts detailed information in a textual form with respect to the tactile element, which is indicated by the input from the tactile interface device or positioned by the input coordinates, into a voice.

Meanwhile, when the application execution unit 3000 is actual driven, and when all of the GUI elements outputted on the monitor display screen are converted into tactile graphics and outputted to the tactile interface device, the user may have the difficulty to understand the tactile graphics.

Therefore, according to an embodiment of the present invention, the focus area of the display screen outputted from the application execution unit 3000 is converted into the tactile graphic data. In other words, only or around the focus area corresponding to the area focused by the user is converted into the tactile graphic data and then displayed as the tactile graphic, such that the user can quickly and conveniently recognize only the area currently focused, thus an error in recognition and input of the user can be removed.

Meanwhile, the focus area is determined by at least one of the previous inputs by the user. For example, when the user shifts the input coordinates in the tactile interface device through a touch input and an area of the input coordinates is focused by a gesture such as a tap, a focusing area is determined by the above inputs of the user. Alternatively, when the user shifts the input coordinates in the application through the direction key input of the tactile interface device, or when an area indicated by the corresponding input coordinates is focused by a key input such as an execution key input, the focus area is determined.

Meanwhile, the tactile graphic converting unit 2210 defines the focus area into a plurality of focus partial areas, and performs an operation of converting a display element of each of the focus partial areas into a tactile graphic element according to a preset conversion rule, thereby generating tactile graphic data.

FIG. 13 shows an example of the preset conversion rule for converting the display element into the tactile graphic element.

For example, in FIG. 13, when the display element (GUI element) corresponds to a 'Button', the form outputted on an actual screen of the application execution unit 3000 is a GUI having the form shown in the item indicating "Visual Design" in FIG. 13. In addition, according to the conversion rule shown in FIG. 13, the above display element for the 'Button' is converted into a tactile icon as the tactile graphic element which can be expressed into the tactile graphic, and the converted tactile icon is implemented as the tactile graphic in the tactile interface device.

Meanwhile, by the input of the user in the tactile interface device, preferably, by the gesture-type input, the user may recognize the detailed information on the tactile icon through the braille-type tactile graphic of the tactile interface device or the voice due to the TTS conversion.

Figure 12:
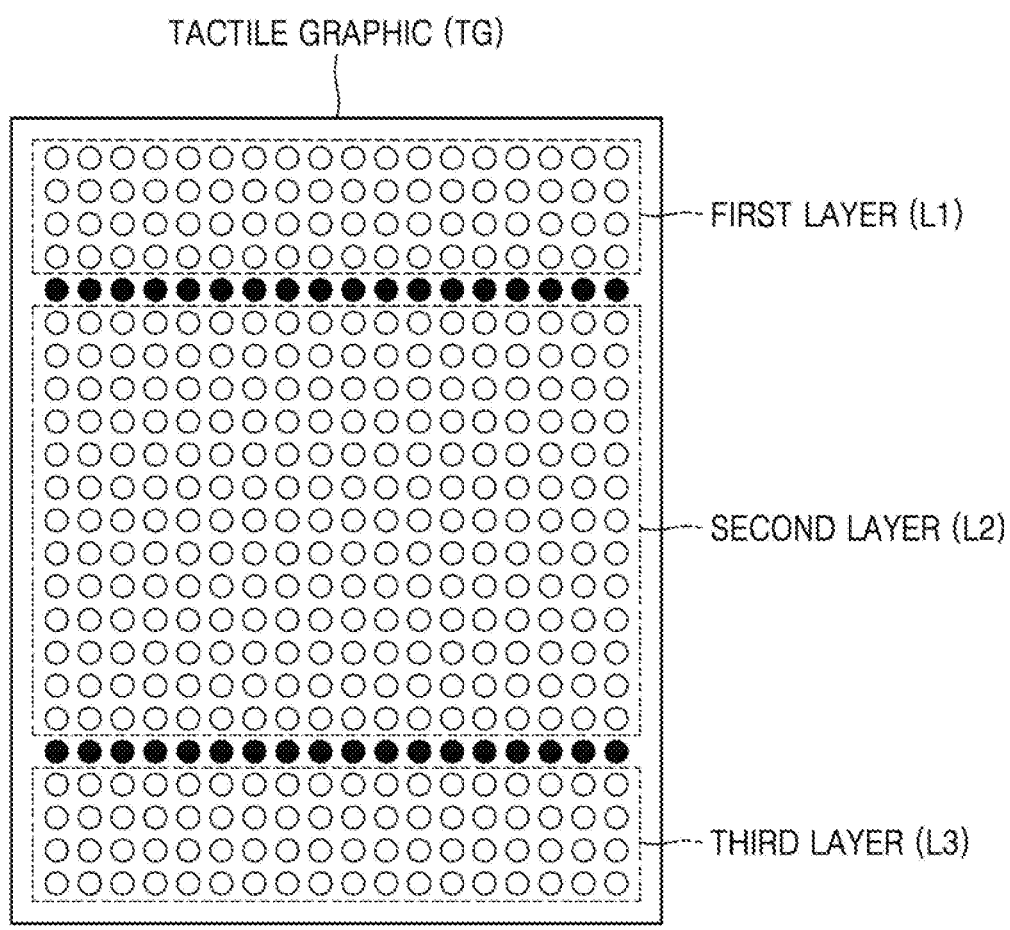
FIG. 12 is a schematic view illustrating a tactile graphic according to an embodiment of the present invention.

FIG. 12 is a schematic view illustrating a tactile graphic according to an embodiment of the present invention.

The tactile graphic includes a plurality of layers, and the layers include a first layer 4100, a second layer 4200, and a third layer 4300 in the embodiment shown in FIG. 12. The focus partial areas correspond to the layers, respectively. In other words, the focus area including a part of the display screen outputted from the application execution unit 3000 is formed of a plurality of focus partial areas, and the focus partial areas correspond to the layers, respectively. Accordingly, the tactile graphic converting unit 2210 converts the display screen into the tactile graphic for each focus partial area or layer.

The first layer 4100 is a screen control area, and may include at least one of an icon indicating a title of the tactile graphic currently outputted from the tactile interface device, and tactile icons of the buttons for switching screens, such as 'previous', 'confirm', 'cancel', and 'close'. In other words, the first layer 4100 includes the tactile icon for executing an instruction to change a screen of the display screen outputted from the application execution unit 3000.

The second layer 4200 is a layer for providing a tactile graphic for a button, a menu, a folder, graphic information, and the like to a main screen area. The user may perform the text input, recognize the graphic information, recognize GUI elements, or perform user control input through the second layer 4200.

The third layer 4300 is a layer for displaying detailed information on the tactile graphic element outputted from the application execution unit 3000 in the form of the braille. The user may confirm the detailed information on the tactile elements by recognizing the braille outputted to the third layer 4300. As described aforesaid, the above confirmation of the detailed information may also be performed by the voice converted by the TTS converting unit 2220.

According to the above tactile interface device and the computing device for controlling the same, the visually impaired also can use a program such as 'Paint' which is an auxiliary program of WINDOWS™. The visually impaired can input a picture including a line through the second layer 4200, perceive the picture drawn by the visually impaired by using the tactile sense in real time, and complete the picture based on the perceived picture information.

Meanwhile, as for the above-mentioned method of controlling the tactile interface device, embodiments have been described in the aspect of the tactile interface device capable of performing both output and input and the control for the same. However, the present invention is not limited thereto, and also includes a method for controlling a tactile interface device capable of performing the output only or a tactile interface device capable of performing the input only, a device therefor and a non-transitory computer-readable medium.

Figure 8:
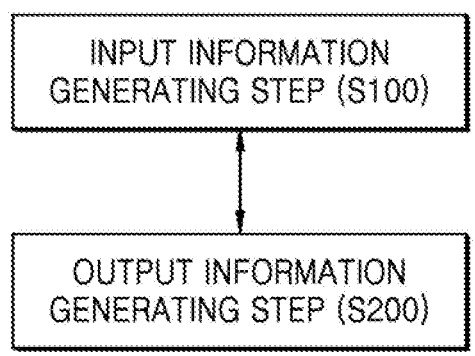
FIG. 8 is a schematic view illustrating steps of a method of controlling a tactile interface device according to an embodiment of the present invention.

FIG. 8 is a schematic view illustrating steps of a method of controlling a tactile interface device according to an embodiment of the present invention.

As shown in FIG. 8, the method of controlling a tactile interface device implemented by a computing device and connected to the computing device to interact with the user according to the embodiment includes: an input information generating step S100 of generating input information to an application being executed in the computing device based on an input at the tactile interface device; and an output information generating step S200 of generating output information to the tactile interface device based on an output of a focus area among outputs from the application being executed in the computing device. The output information includes data capable of implementing a tactile graphic formed of a plurality of two-dimensional tactile pixels.

The tactile interface device may provide a tactile graphic by tactile sensation, and the input information generation step S100 and the output information generation step S200 may be performed in real-time. In detail, the user may recognize the tactile graphic outputted in the output information generating step S200 and perform an input based on the tactile graphic, and, preferably, the input of the user may be converted into the form to be inputted to the application execution unit 3000 or the input information may be generated in the input information generating step S100.

Figure 9:
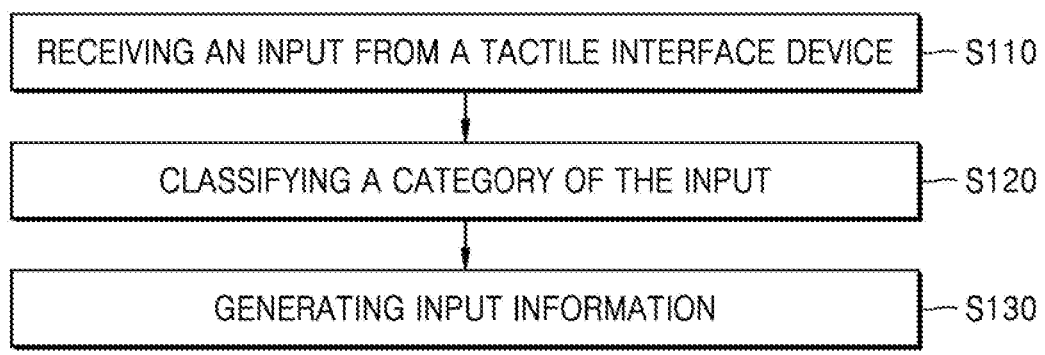
FIG. 9 is a schematic view illustrating processes of an input information generating step according to an embodiment of the present invention.

FIG. 9 is a schematic view illustrating processes of an input information generating step S100 according to an embodiment of the present invention.

The input information generating step S100 include: an input receiving step S110 of receiving an input from the tactile interface device; an input category classifying step S120 for classifying a category of the input information; and an application input generating step S130 for generating input information having a form to be inputted to the application or converting the input into input information having a form to be inputted to the application based on the input according to the input category.

The category of the input includes at least one of a key input and a touch input. Upon the key input, braille information, input coordinate shift information by a direction key input, and command information by a command key input may be inputted. Upon the touch input, coordinate shift information and gesture information may be inputted.

When the category of the input information is the touch input, in the input information converting step S130 including determining whether the touch input corresponds to the input of the input coordinates. When the touch input corresponds to the input coordinates, the input coordinates inputted from the tactile interface device are converted into input coordinates in the application execution unit 3000.

The input information converting step S130 for the above coordinates is configured to convert the coordinates or input coordinates in the tactile interface device into coordinates in the application execution unit 3000.

When the category of the input is the touch input, the application input creating step (S130) including determining whether the touch input is matched with any one of a plurality of preset gestures, and generating an application input corresponding to the matched gesture.

Herein, examples of the preset gesture are shown in Table 1.

When the category of the input is the touch input, the application input generating step includes determining whether the touch input corresponds to the input by input coordinates other than the input by the gesture. When the touch input corresponds to the input of the input coordinates, the input coordinates inputted from the tactile interface device are converted into input coordinates in the application.

The interaction between the tactile interface device and the electronic device may be primarily performed through the gesture recognition function and input coordinates recognition function of the touch input. It is preferable that a specific operation is recognized by defining various touch operations as shown in Table 1, and then the specific operation is transmitted to the application execution unit 3000 of the computing device as an input signal, so that a familiar and intuitive computer operation is provided to the visually impaired.

When an electronic device is a PC, tactile icons are being implemented in the tactile graphic which is outputted after reconfiguring the GUI elements of a monitor display screen of the PC. When the input coordinates where the touch input is generated in the tactile interface device are used without change, the application execution unit 3000 of the electronic device cannot determine which GUI element the event has occurred for, because the above tactile icons do not one-to-one matched with the monitor display screen spatially. The application input generating step S130 with respect to key input having input coordinate shift information or the touch input for inputting input coordinates substantially corresponds to the coordinate mapping function. Preferably, when the tactile icon object currently being outputted as the tactual graphic and the actual application execution unit 3000 are driven, the recognized touch coordinates are mapped by forming mapping table so as to function for mapping a GUI element outputted on the monitor display screen.

Preferably, at least one tactile cell included in the tactile pixel region where the tactile input coordinates are located may periodically move up and down or vibrate. The above up/down movement or vibration of the tactile pixel may allow the user to grasp which display element the cursor lies on, or where the tactile input coordinates is, by using the tactile sense of the user.

Figure 10:
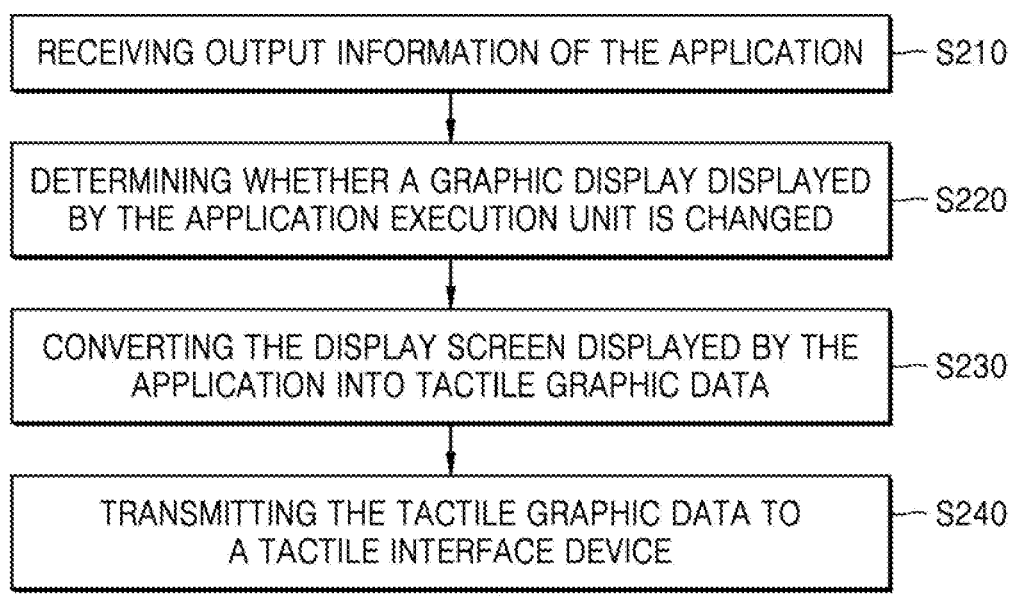
FIG. 10 is a schematic view illustrating processes of an output information generating step according to an embodiment of the present invention.

FIG. 10 is a schematic view illustrating processes of an output information generating step S200 according to an embodiment of the present invention. The output information generating step S200 is a step of converting a focus area including a part of the display screen outputted from the application execution unit 3000 into the tactile graphic data.

The output information generating step S200 includes: a step S210 of receiving output information of the application executed by the application execution unit 3000; a change determining step S220 of determining whether the display screen displayed in the focus area of the application executed by the application execution unit 3000 is changed; a tactile graphic generating step S230 for generating the tactile graphic data based on the display screen displayed in the focus area of the application executed by the application execution unit 3000; and a step S240 of transmitting the tactile graphic data to the tactile interface device.

Preferably, when the display screen is determined to be changed in the change determining step, the tactile graphic converting step may be performed.

Figure 11:
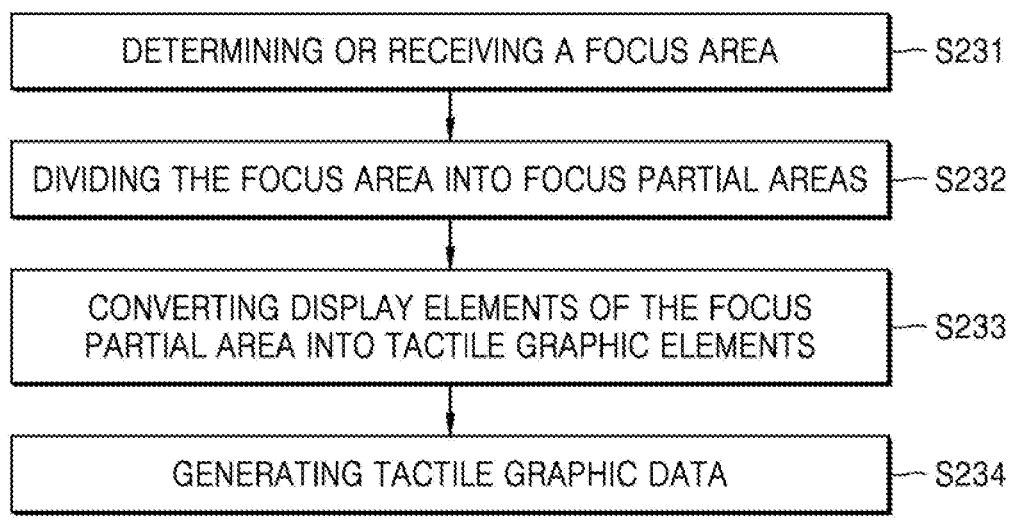
FIG. 11 is a schematic view illustrating processes of a tactile graphic converting step according to an embodiment of the present invention.

FIG. 11 is a schematic view illustrating processes of a tactile graphic converting step S230 according to an embodiment of the present invention.

When the application is actually executed by the application execution unit 3000 and when all of the GUI elements outputted on the monitor display screen are converted into tactile graphics and outputted to the tactile interface device, the user may have the difficulty to understand the tactile graphics.

Therefore, according to an embodiment of the present invention, the tactile graphic generating step S230 may preferably convert the focus area including the part of the display screen outputted from the application execution unit 3000 into the tactile graphic data. In other words, only or around the focus area corresponding to the area focused by the user is converted into the tactile graphic data and then displayed as the tactile graphics, such that the user can quickly and conveniently recognize only the area currently focused, thus an error in recognition and input of the user can be removed.

Meanwhile, the focus area is determined by at least one of the previous inputs by the user. For example, when the user shifts input coordinates in the tactile interface device by the touch input and an area of the input coordinates is focused by a gesture such as a tap, the focusing area is determined by the inputs of the user.

Alternatively, when the user shifts the input coordinates of the application or the tactile input coordinates in the tactile graphic by inputting the direction key of the tactile interface device, or when an area indicated by the corresponding input coordinates or tactile input coordinates is focused by a key input such as the execution key input after the input coordinates or the tactile input coordinates are shifted, the focus area may be determined.

According to an embodiment of the present invention, in the tactile graphic generating step S230, the focus area is defined into a plurality of focus partial areas, and an operation of converting a display element of each of the focus partial areas into a tactile graphic element according to a preset conversion rule is performed, thereby generating tactile graphic data. The tactile graphic element may express the tactile icon.

In other words, the tactile graphic generating step S230 of converting the display screen displayed by the application execution unit 3000 into the tactile graphic data includes: a focus area determining/receiving step S231 of determining or receiving the focus area including the part of the display screen outputted from the application execution unit 3000;

a focus partial area defining step S232 of defining the focus area into a plurality of focus partial areas;

a tactile graphic element converting step S233 of converting the display element of focus partial areas into the tactile graphic element according to a preset conversion rule; and a tactile graphic data generating step S234 of generating the tactile graphic data including the tactile graphic element.

FIG. 13 shows an example of the preset conversion rule for converting the display element into the tactile graphic element.

For example, in FIG. 13, when the display element (GUI element) corresponds to a 'Button', the form outputted on an actual screen of the application execution unit 3000 is a GUI having the form shown in the item of Visual Design in FIG. 13. In addition, the above display element with respect to the 'Button' is converted into the tactile icon according to the conversion rule shown in FIG. 13, in which the tactile icon is a tactile graphic element that can be expressed as a tactile graphic, and then the converted tactile icon is implemented as the tactile graphic in the tactile interface device.

Meanwhile, by the input of the user in the tactile interface device, preferably, by a gesture-type input, the detailed information about the tactile icon may be outputted in the form of the braille tactile graphic of the tactile interface device or the voice by the TTS conversion.

FIG. 12 is a schematic view illustrating a tactile graphic according to an embodiment of the present invention. In FIG. 12, the tactile graphic includes a plurality of layers, and the layers include a first layer 4100, a second layer 4200, and a third layer 4300.

The focus partial areas correspond to the layers, respectively. In other words, the focus area including a part of a graphic display outputted from the application execution unit 3000 is formed of a plurality of focus partial areas, in which the focus partial areas correspond to the layers, respectively. Accordingly, the tactile graphic converting unit 2210 converts the graphic display into the tactile graphic for each focus partial area or layer.

The first layer 4100 is a screen control area, and may include at least one of an icon indicating a title of the tactile graphic currently outputted from the tactile interface device, and tactile icons of the buttons for switching screens such as 'previous', 'confirm', 'cancel', and 'close'. In other words, the first layer 4100 includes a tactile icon for executing an instruction to change a screen of the graphic display outputted from the application execution unit 3000.

The second layer 4200 is a layer in which a main screen area is provided with a tactile graphic for a button, a menu, a folder, graphic information, and the like. The user may perform the text input, recognize the graphic information, recognize GUI elements, or perform user control input through the second layer 4200.

The third layer 4300 is a layer for displaying detailed information on the tactile graphic element outputted from the application execution unit 3000 in the form of the braille. The user may confirm the detailed information about the tactile elements by recognizing the braille outputted to the third layer 4300. As described aforesaid, the above confirmation of the detailed information may also be performed by the voice converted by the TTS converting unit 2220.

According to the above method of controlling the tactile interface device, the visually impaired also can use a program such as 'Paint' which is an auxiliary program of WINDOWS™. The visually impaired can input a picture including a line through the second layer 4200, perceive the picture drawn by the visually impaired by using the tactile sense in real time, and complete the picture based on the perceived picture information.

Meanwhile, as for the above-mentioned method of controlling the tactile interface device, embodiments have been described in the aspect of the tactile interface device capable of performing both output and input and the control for the same. However, the present invention is not limited thereto, and also includes a method for controlling a tactile interface device capable of performing the output only or a tactile interface device capable of performing the input only.

Hereinafter, embodiments of the graphic display outputted from the application execution unit 3000 and converted by the method of controlling the tactile display device according to the present invention will be described. Hereinafter, the preset conversion rule shown in FIG. 13, which converts the display element of the graphic display into the tactile graphic element, will be applied.

Figure 14:
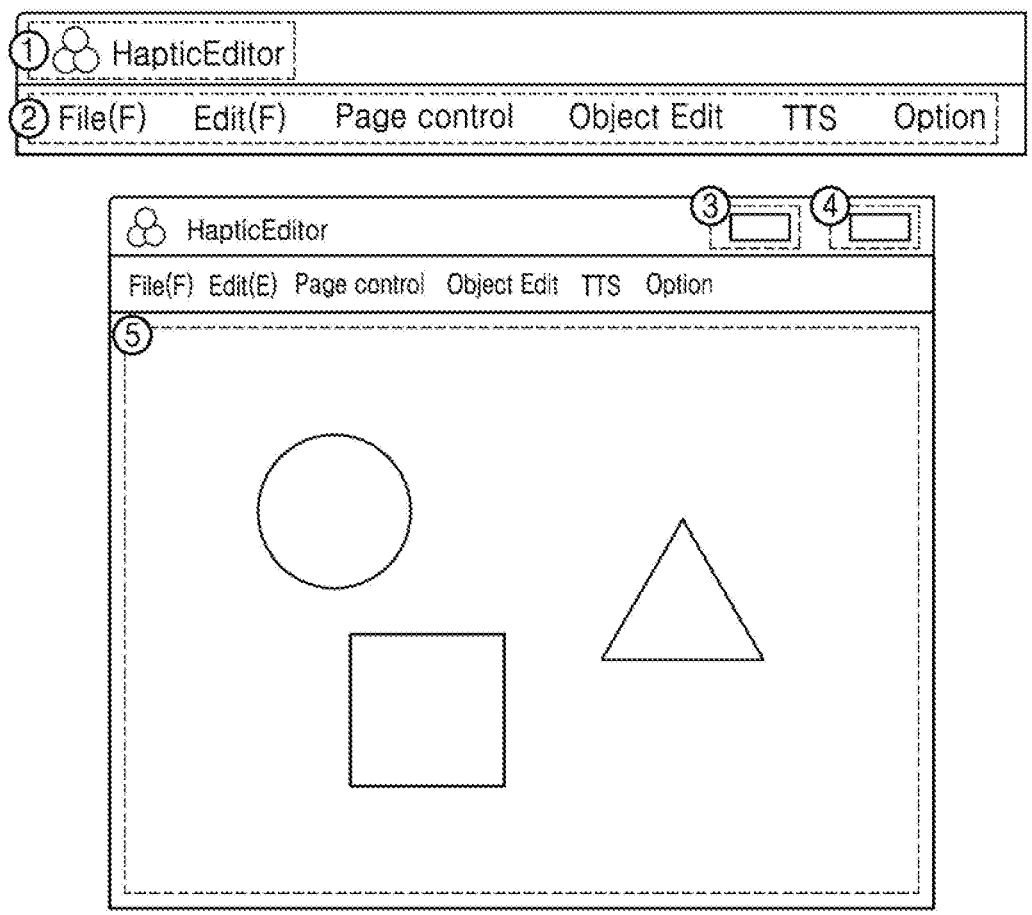
FIG. 14 is a view illustrating a first example of a display screen of a computing device.

FIG. 14 is a view illustrating a first example of a display screen of a computing device B.

In FIG. 14, the focus area corresponds to a window where the application is executed, and the focus partial area may be divided into a first focus partial area including (1), (2), (3), and (4), and a second focus partial area including (5).

The above (1) corresponds to a title of the application, (2) corresponds to a menu bar of the application, (3) corresponds to a 'Minimize' button of the application, (4) corresponds to a 'Close' button of the application, and (5) corresponds to a window displaying objects displayed in the application.

Figure 15:
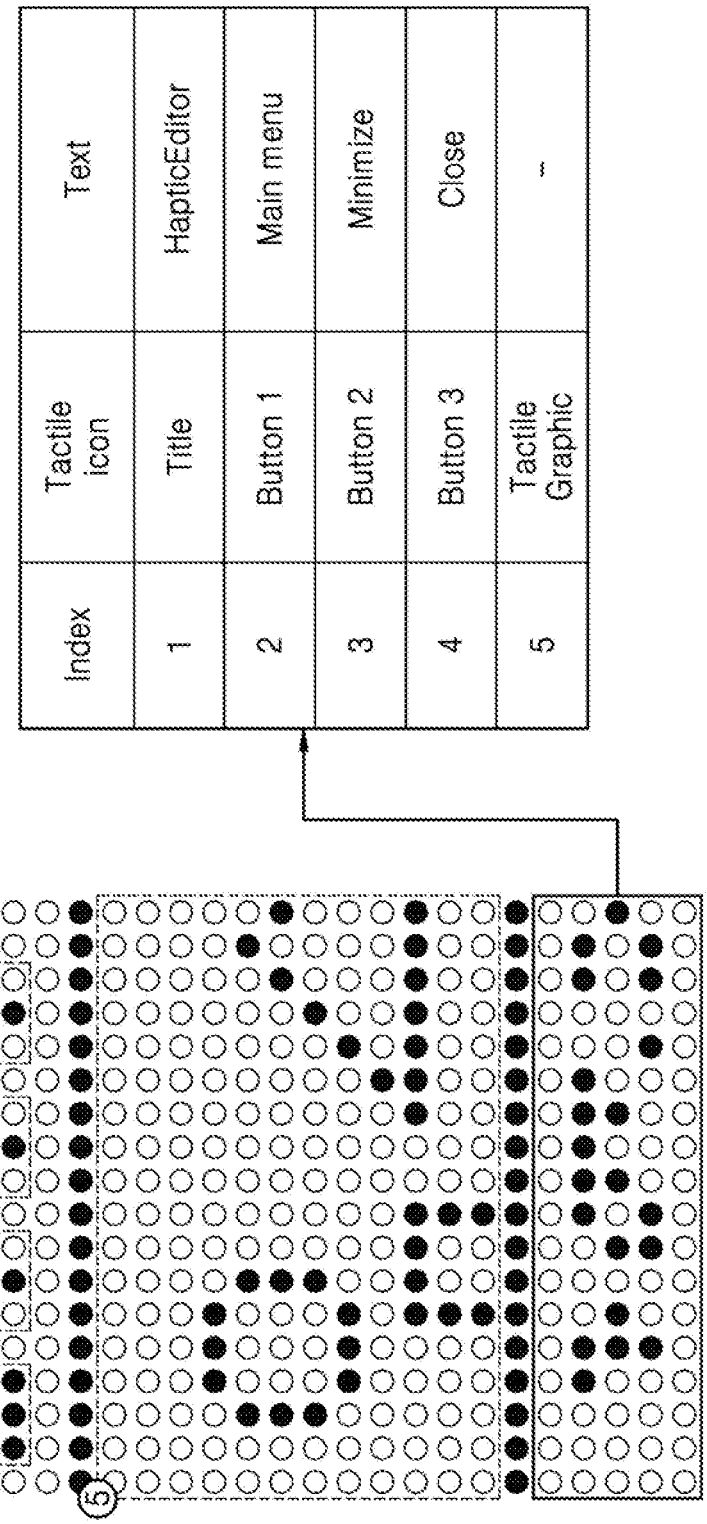
FIG. 15 is a view illustrating a tactile graphic of a display screen shown in FIG. 14 by converting a first example into the tactile graphic according to an embodiment of the present invention.

FIG. 15 is a view illustrating a tactile graphic converted and outputted according to an embodiment of the present invention by using a first example of a display screen shown in FIG. 14.

The first focus partial area including the above (1), (2), (3), and (4) is converted or mapped to a layer (first layer 4100) at an upper section of the tactile graphic, and the second focus partial area including the above (5) is converted or mapped to a layer (second layer 4200) at a middle section of the tactile graphic. As described above, the conversion rule upon mapping follows the rule shown in FIG. 13.

Meanwhile, a layer at a lower section of the tactile graphic corresponds to a layer that represents text information of the tactile icon touch inputted or designated by the user in the first layer 4100 and the second layer 4200 in the form of the braille.

For example, the area (1) corresponds to a title and is converted into a tactile icon preset by the conversion rule shown in FIG. 13, thereby being implemented in the first layer 4100 of the tactile graphic. In response to the above, when the user performs a gesture such as a tap on the tactile icon corresponding to the area (1), a 'Haptic Editor' corresponding to the detailed information of the title may be outputted in the braille form in the third layer 4300. Alternatively, when the user changes the input coordinates or the tactile input coordinates to the tactile icon corresponding to the area (1), "Haptic Editor" corresponding to the detailed information of the title may be automatically outputted in the braille form in the third layer 4300.

Figure 16:
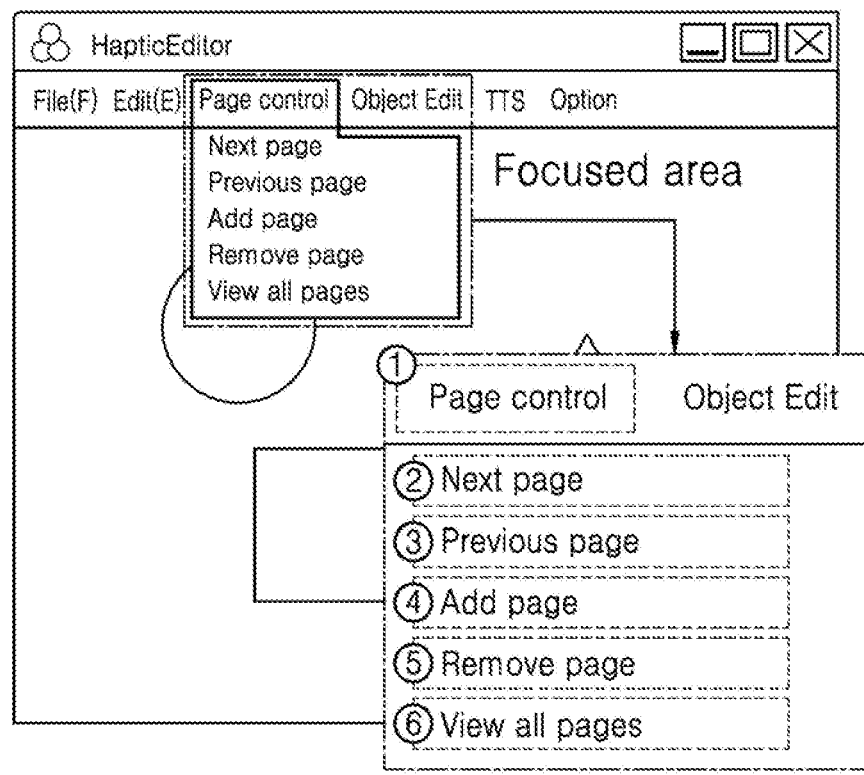
FIG. 16 is a view illustrating a second example of a display screen of a computing device.

FIG. 16 is a view illustrating a second example of a display screen (graphic display) of a computing device B.

Figure 17:
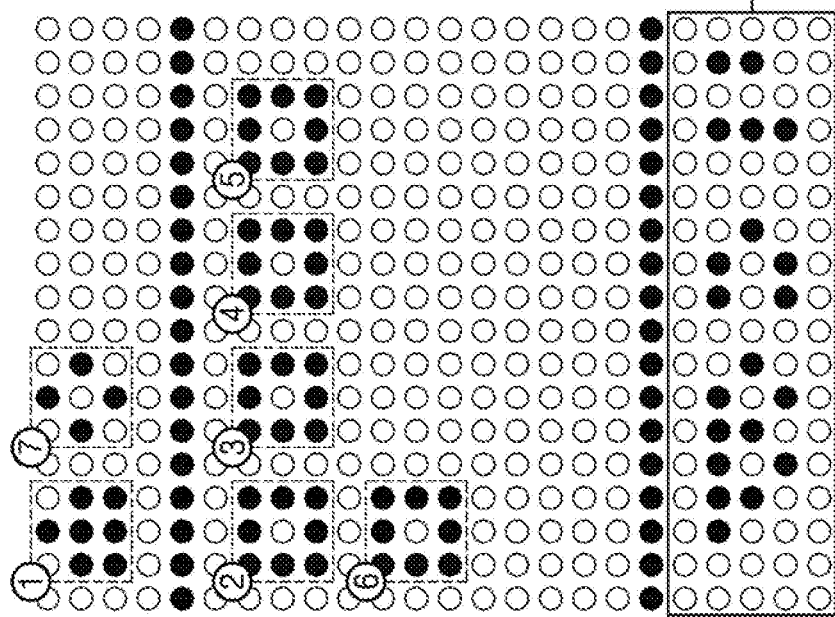
FIG. 17 is a view illustrating a tactile graphic of a display screen shown in FIG. 16 by converting a second example into the tactile graphic according to an embodiment of the present invention.

The display screen of FIG. 16 is a graphic display when a menu bar corresponding to the area 2 is selected in the application shown in FIG. 17 and 'Page Control' is inputted or selected in the menu bar.

In the above case, the focus area may correspond to an area indicated as "Focused area" in FIG. 16, and the focus partial area may be divided into a first focus partial area including (1) and a second focus partial area including (2) to (6).

The above (1) corresponds to the title selected in the menu bar, and the above (2) to (6) correspond to sub-menus to be selected in the title.

FIG. 17 is a view illustrating a tactile graphic converted and outputted according to an embodiment of the present invention by using a second example of a display screen shown in FIG. 16.

The first focus partial area including the above (1) and (7) is converted or mapped to a layer (first layer 4100) at an upper section of the tactile graphic, and the second focus partial area including the above (2) to (5) is converted or mapped to a layer (second layer 4200) at a middle section of the tactile graphic. As described above, the conversion rule upon mapping follows the rule shown in FIG. 13. Meanwhile, (7) is a tactile icon for a 'Back' button, and corresponds to an icon generated by itself to increase the convenience for the user in the controlling method according to the present invention, although not actually included in the display screen of the application.

Meanwhile, a layer at a lower section of the tactile graphic corresponds to a layer that represents text information of the tactile icon corresponding to the input coordinates or tactile input coordinates touch inputted or designated by the user in the first layer 4100 and the second layer 4200 in the form of the braille.

For example, the area (1) corresponds to a title and is converted into a tactile icon preset by the conversion rule shown in FIG. 13, thereby being implemented in the first layer 4100 of the tactile graphic. In response to the above, when the user performs a gesture such as a tap on the tactile icon corresponding to the area (1), a 'Page Control' corresponding to the detailed information of the title may be outputted in the braille form in the third layer 4300.

FIG. 18 is a schematic view illustrating a process of drawing a picture by the visually impaired person through a tactile interface device according to an embodiment of the present invention.

According to the tactile interface device and the computing device (B) for controlling the same, the visually impaired also can use a program such as 'Paint' which is an auxiliary program of WINDOWS™. In other words, when the application is configured to execute a function for inputting, editing, and saving a graphic, the visually impaired can utilize the graphic input and related functions executed in the conventional computing device which has not been available for the visually impaired. Specifically, the visually impaired can input a picture including a line through the second layer 4200, perceive the picture drawn by the visually impaired by using the tactile sense in real time, and complete the picture based on the perceived picture information. In other words, according to one embodiment of the present invention, the visually impaired also can easily input, edit and save the graphic by using the computer.

Figure 19:
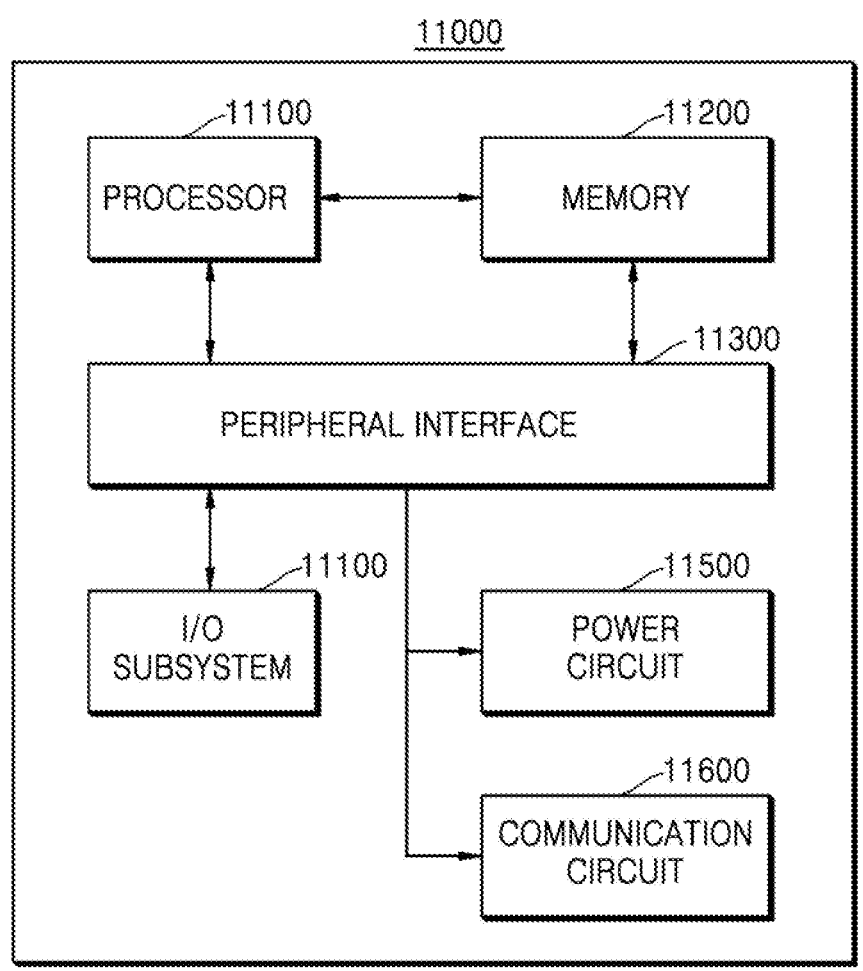
FIG. 19 is a view illustrating an example of an internal configuration of a computing device according to an embodiment of the present invention.

FIG. 19 is a block diagram for describing an example of an internal configuration of a computing device according to an embodiment of the present invention.

As shown in FIG. 19, the computing device 11000 may include at least one processor 11100, a memory 11200, a peripheral interface 11300, an I/O subsystem 11400, a power circuit 11500, and a communication circuit 11600. Herein, the computing device 11000 may correspond to a user terminal A connected to the tactile interface device or correspond to the above-mentioned computing device B.

The memory 11200 may include, for example, a high-speed random access memory, a magnetic disk, an SRAM, a DRAM, a ROM, a flash memory and a nonvolatile memory. The memory 11200 may include software modules, instruction sets, or various other data required for an operation of the computing device 11000.

Herein the access to the memory 11200 from other components of the processor 11100 or the peripheral interface 11300, may be controlled by the processor 11100.

The Peripheral interface 11300 may combine an input and/or output peripheral device of the computing device 11000 to the processor 11100 and the memory 11200. The processor 11100 executes the software module or the instruction set stored in memory 11200, thereby performing various functions for the computing device 11000 and processing data.

The I/O subsystem 11400 may combine various input/output peripheral devices to the peripheral interface 11300. For example, the I/O subsystem 11400 may include a controller for combining the peripheral device such as monitor, keyboard, mouse, printer, or a touch screen or sensor, if needed, to the peripheral interface 11300. According to another aspect, the input/output peripheral devices may be combined to the peripheral interface 11300 without passing through the I/O subsystem 11400.

The power circuit 11500 may provide power to all or a portion of the components of the terminal. For example, the power circuit 11500 may include a power management system, at least one power source such as a battery or an alternating current (AC), a charging system, a power failure detection circuit, a power converter or inverter, a power status indicator, and any other components for generating, managing, and distributing the power The communication circuit 11600 uses at least one external port, thereby enabling communication with other computing devices.

Alternatively, as described above, the communication circuit 11600 may include an RF circuit, if needed, to transmit and receive an RF signal, also known as an electromagnetic signal, thereby enabling communication with other computing devices.

The above embodiment of FIG. 19 is merely an example of the computing device 11000. In the computing device 11000, some components shown in FIG. 19 may be omitted, additional components not shown in FIG. 19 may be further provided, or a configuration or arrangement for combining at least two components may be provided. For example, a computing device for a communication terminal in a mobile environment may further include a touch screen, a sensor, and the like in addition to the components shown in FIG. 18, and the communication circuit may include a circuit for RF communication of various communication schemes (such as WiFi, 3G, LTE, Bluetooth, NFC, and Zigbee). The components that may be included in the computing device 11000 may be implemented by hardware, software, or a combination of both hardware and software which include at least one integrated circuit specialized in a signal processing or an application.

The methods according to the embodiments of the present invention may be implemented in the form of program instructions to be executed through various computing devices, thereby being recorded in a computer-readable medium. Particularly, a program according to the embodiment may be configured as a PC-based program or an application dedicated to a mobile terminal. The application to which the present invention is applied may be installed in the user terminal through a file provided by a file distribution system. For example, the file distribution system may include a file transmission unit (not shown) for transmitting the file according to a request of the user terminal.

The above-mentioned device may be implemented by hardware components, software components, and/or a combination of the hardware components and the software components. For example, the devices and components described in the embodiments may be implemented by using at least one general purpose computer or special purpose computer such as a processor, a controller, an arithmetic logic unit (ALU), a digital signal processor, a microcomputer, a field programmable gate array (FPGA), a programmable logic unit (PLU), a microprocessor, or any other device capable of executing and responding to instructions. The processing device may execute an operating system (OS) and at least one software application executed on the operating system. In addition, the processing device may access, store, manipulate, process, and create data in response to the execution of the software. In some cases, one processing device is used for the further understanding, however, it will be appreciated by those skilled in the art that the processing device may include a plurality of processing elements and/or a plurality of types of processing elements. For example, the processing device may include a plurality of processors or one processor and one controller. In addition, other processing configurations, such as a parallel processor, may be possible.

The software may include a computer program, a code, and an instruction, or a combination of at least one thereof, and may configure the processing device to operate as desired, or may instruct the processing device independently or collectively. In order to be interpreted by the processor or to provide instructions or data to the processor, the software and/or data may be permanently or temporarily embodied in any type of machine, component, physical device, virtual equipment, computer storage media or device, or in a signal wave to be transmitted. The software may be distributed over computing devices connected to networks, thereby being stored or executed in a distributed manner.

The software and data may be stored in at least one computer-readable recording media.

The method according to the embodiment may be implemented in the form of a program instruction that may be executed through various computer mechanisms, thereby being recorded in a computer-readable medium. The computer-readable medium may include program instructions, data files, data structures, and the like, independently or in combination thereof. The program instructions recorded in the medium may be specially designed and configured for the embodiment, or may be known to those skilled in the art of computer software so as to be used. An example of the computer-readable medium includes a hard disk, a magnetic media such as a floppy disk and a magnetic tape, an optical media such as a CD-ROM and a DVD, a magneto-optical media such as a floptical disk, and a hardware device specially configured to store and execute a program instruction such as ROM, RAM, and flash memory. An example of the program instruction includes a high-level language code to be executed by a computer using an interpreter or the like, as well as a machine code generated by a compiler. The above hardware device may be configured to operate as at least one software module to perform the operations of the embodiments, and vice versa.

Although the above embodiments have been described with reference to the limited embodiments and drawings, however, it will be understood by those skilled in the art that various changes and modifications may be made from the above-mentioned description. For example, even though the described descriptions are performed in an order different from the described manner, and/or the described components such as system, structure, device, and circuit are coupled or combined in a form different from the described manner, or replaced or substituted by other components or equivalents, appropriate results may be achieved.

Therefore, other implementations, other embodiments, and equivalents to the claims are also within the scope of the following claims.

The invention claimed is:

1. A method of controlling a tactile interface device implemented by a computing device including a processor and connected to the computing device to interact with a user, the method comprising:
generating information inputted into an application configured to be executed in the computing device based on an input at the tactile interface device including a first layer, a second layer, and a third layer, wherein
the first layer is a screen control area including at least one of an icon indicating a title of a tactile graphic being outputted from the tactile interface device, and a tactile icon for executing an instruction to change a screen of a display screen of the computing device,
the second layer is a layer for providing a tactile graphic for at least one of a button, a menu, a folder, and graphic information, included in a main screen area of the application, and
the third layer is a layer for displaying additional information in a form of Braille, regarding tactile graphic elements outputted from the application;
selecting a focus area among outputs from the application;
dividing the focus area into focus partial areas including a first focus partial area, a second focus partial area, and a third focus partial area, which correspond to the first layer, the second layer, and the third layer, respectively; and
generating output information configured to be transmitted to the tactile interface device, based on the divided focus partial areas, wherein
the output information comprises data for implementing the tactile graphic formed of a plurality of two-dimensional tactile pixels, and
the input at the tactile interface device comprises a touch input of the user.

2. The method of claim 1, wherein the generating the information inputted to the application comprises:
classifying a category of the input at the tactile interface device; and
generating input information configured to be inputted into the application based on the input, according to the category of the input.

3. The method of claim 2, wherein the category of the input comprises a key input and a touch input.

4. The method of claim 3, further comprising:
when the category of the input is the touch input, determining whether the touch input is matched with one of a plurality of preset gestures to generate an application input corresponding to the matched gesture.

5. The method of claim 4, further comprising:
when the category of the input is the touch input, determining whether the touch input corresponds to the input by input coordinates other than the input by the gesture, in which when the touch input corresponds to the input of the input coordinates, the input coordinates inputted from the tactile interface device are converted into input coordinates in the application.

6. The method of claim 5, further comprising:
when the category of the input is the key input, converting the key input into an input configured to be inputted into the application.

7. The method of claim 1, wherein the generating the output information comprises:
determining whether the display screen displayed in the focus area of the application is changed; and
generating, when it is determined that the display screen displayed in the focus area is changed, tactile graphic data corresponding to the changed display screen.

8. The method of claim 1, wherein the focus area is decided by one or more user inputs.

9. The method of claim 1, wherein the generating the output information comprises:
generating braille information expressed by using a tactile pixel in the tactile interface device or sound information configured to be reproduced in the tactile interface device, based on detailed information of a tactile graphic element corresponding to input coordinates by the touch input of the user, and
wherein the output information includes the braille information or the sound information.

10. The method of claim 1, wherein
the focus area corresponds to a window GUI where the application is executed,
the first focus partial area includes a title of the application, a menu bar of the application, a button for minimizing the window GUI of the application, and a button for closing the window GUI of the application,
the second focus partial area includes an inside area of the window GUI, including graphic objects displayed in the application,
the first focus partial area is configured to be converted or mapped to the first layer positioned at an upper section of the tactile graphic,
the second focus partial area is configured to be converted or mapped to the second layer positioned at a middle section of the tactile graphic, and
the third layer positioned at a lower section of the tactile graphic is configured to show text information of a tactile icon touch inputted or designated by the user in the first layer and the second layer in the form of Braille.

11. The method of claim 1, wherein
the focus area corresponds to a GUI menu of the application, selected by the user,
the first focus partial area includes a title of the selected GUI menu,
the second focus partial area includes sub-menus of the selected GUI menu,
the first focus partial area is configured to be converted or mapped to the first layer positioned at an upper section of the tactile graphic,
the second focus partial area is configured to be converted or mapped to the second layer positioned at a middle section of the tactile graphic, and
the third layer positioned at a lower section of the tactile graphic is configured to show text information of a tactile icon touch inputted or designated by the user in the first layer and the second layer in the form of Braille.

12. A non-transitory computer-readable medium for storing commands for enabling a computing device to perform:
generating information inputted to an application configured to be executed in the computing device based on an input in a tactile interface device including a first layer, a second layer, and a third layer, wherein
the first layer is a screen control area including at least one of an icon indicating a title of a tactile graphic being outputted from the tactile interface device, and a tactile icon for executing an instruction to change a screen of a display screen of the computing device,
the second layer is a layer for providing a tactile graphic for at least one of a button, a menu, a folder, and graphic information, included in a main screen area of the application, and the third layer is a layer for displaying additional information in a form of Braille, regarding tactile graphic elements outputted from the application;

selecting a focus area among outputs from the application;

dividing the focus area into focus partial areas including a first focus partial area, a second focus partial area, and a third focus partial area, which correspond to the first layer, the second layer, and the third layer, respectively; and generating output information configured to be transmitted to the tactile interface device based on the divided focus partial areas, wherein the output information includes data for implementing the tactile graphic formed of a plurality of two-dimensional tactile pixels.

13. The non-transitory computer-readable medium of claim 12, wherein the generating information inputted to the application:

classifying a category of the input at the tactile interface device; and generating step of generating input information configured to be inputted into the application based on the input, according to the category of the input.

14. The non-transitory computer-readable medium of claim 13, wherein the category of the input comprises a key input and a touch input.

15. A computing device comprising at least one processor and at least one memory and capable of controlling a tactile interface device, wherein the processor of the computing device is configured to:

generate information inputted to an application configured to be executed in the computing device based on an input from the tactile interface device including a first layer, a second layer, and third layer, wherein the first layer is a screen control area including at least one of an icon indicating a title of a tactile graphic being outputted from the tactile interface device, and a tactile icon for executing an instruction to change a screen of a display screen of the computing device, the second layer is a layer for providing a tactile graphic for at least one of a button, a menu, a folder, and graphic information, included in a main screen area of the application, and the third layer is a layer for displaying additional information in a form of Braille, regarding tactile graphic elements outputted from the application;

select a focus area among outputs from the application;

divide the focus area into focus partial areas including a first focus partial area, a second focus partial area, and a third focus partial area, which correspond to the first layer, the second layer, and the third layer, respectively; and generate output information configured to be transmitted to the tactile interface device based the divided focus partial areas, and wherein the output information includes data for implementing the tactile graphic formed of a plurality of two-dimensional tactile pixels, and the input at the tactile interface device includes a touch input of a user.

16. The computing device of claim 15, wherein the processor is further configured to:

classify an input category from the tactile interface device; and generate input information configured to be inputted into the application based on the input, according to the category of the input.

17. The computing device of claim 16, wherein the category of the input comprises a key input and a touch input.

* * * * *